US011508296B2

(12) United States Patent
Onuma et al.

(10) Patent No.: US 11,508,296 B2
(45) Date of Patent: Nov. 22, 2022

(54) IMAGE DISPLAY SYSTEM FOR DISPLAYING HIGH DYNAMIC RANGE IMAGE

(71) Applicant: CANON KABUSHIKI KAISHA, Tokyo (JP)

(72) Inventors: Hidetoshi Onuma, Tokyo (JP); Yasushi Ito, Kanagawa (JP); Manabu Umeyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/352,888

(22) Filed: Jun. 21, 2021

(65) Prior Publication Data

US 2021/0407400 A1 Dec. 30, 2021

(30) Foreign Application Priority Data

Jun. 24, 2020 (JP) ............................ JP2020-109002
Oct. 14, 2020 (JP) ............................ JP2020-173541

(51) Int. Cl.
*G06F 3/038* (2013.01)
*G09G 3/3225* (2016.01)

(52) U.S. Cl.
CPC ... *G09G 3/3225* (2013.01); *G09G 2320/0666* (2013.01); *G09G 2320/0673* (2013.01); *G09G 2340/0407* (2013.01); *G09G 2340/06* (2013.01); *G09G 2370/12* (2013.01); *G09G 2370/14* (2013.01)

(58) Field of Classification Search
CPC ......... G09G 3/3225; G09G 2320/0666; G09G 2320/0673; G09G 2340/0407
USPC ........................................................ 345/204
See application file for complete search history.

(56) References Cited

U.S. PATENT DOCUMENTS 10,390,057 B2* 8/2019 Tsukagoshi .......... H04N 21/236
2017/0186141 A1* 6/2017 Ha .......................... G06T 5/009
2018/0152721 A1* 5/2018 Rusanovskyy ........ H04N 19/70
2019/0287494 A1* 9/2019 Yokota ................... G09G 5/391
2019/0356891 A1* 11/2019 Zhang ...................... G09G 5/10
2020/0029096 A1* 1/2020 Rusanovskyy ........ H04N 19/52
(Continued)

FOREIGN PATENT DOCUMENTS

JP 4941285 B2 5/2012

*Primary Examiner* — Jonathan M Blancha
(74) *Attorney, Agent, or Firm* — Canon U.S.A., Inc. IP Division

(57) ABSTRACT

An image generation apparatus outputs image data to a display apparatus, performs inverse conversion on image data, and transmits the image data to the display apparatus through an external data transmission line. The display apparatus includes a display device that is capable of displaying a High Dynamic Range (HDR) image or a Standard Dynamic Range (SDR) image through the external data transmission line. The inverse conversion is performed with respect to light emission characteristics of the display device. The image data is generated by the light emission characteristic inverse conversion unit. The transmission is performed in a case where light emission characteristics of the display device approximate an Electro-Optical Transfer Function (EOTF) of the HDR, a bit precision of image data is no lower than a bit precision of the external data transmission line, and an image of the HDR is to be displayed on the display device.

19 Claims, 18 Drawing Sheets

(56) References Cited

U.S. PATENT DOCUMENTS

| | | | | |
|---|---|---|---|---|
| 2020/0045341 | A1* | 2/2020 | Koo | G09G 5/026 |
| 2021/0201852 | A1* | 7/2021 | Lee | G09G 3/20 |

* cited by examiner

FIG. 10

| LUMINANCE LEVEL (%) | SMPTE ST 2084 | ITU BT.709 | LIGHT EMISSION CHARACTERISTICS OF ORGANIC EL |
|---|---|---|---|
| 0 | 0 | 0 | 0 |
| 1 | 130 | 11 | 138 |
| 5 | 173 | 48 | 168 |
| 10 | 192 | 74 | 184 |
| 15 | 203 | 94 | 194 |
| 20 | 211 | 111 | 202 |
| 25 | 217 | 125 | 209 |
| 30 | 222 | 138 | 214 |
| 35 | 226 | 149 | 219 |
| 40 | 230 | 160 | 223 |
| 45 | 233 | 170 | 227 |
| 50 | 236 | 180 | 230 |
| 55 | 239 | 189 | 234 |
| 60 | 241 | 197 | 237 |
| 65 | 243 | 206 | 239 |
| 70 | 245 | 213 | 242 |
| 75 | 247 | 221 | 244 |
| 80 | 249 | 228 | 247 |
| 85 | 251 | 235 | 249 |
| 90 | 252 | 242 | 251 |
| 95 | 254 | 249 | 253 |
| 100 | 255 | 255 | 255 |

OETF (HORIZONTAL AXIS : CODE VALUE, VERTICAL AXIS : LUMINANCE LEVEL)

IMAGE DISPLAY SYSTEM FOR DISPLAYING HIGH DYNAMIC RANGE IMAGE

BACKGROUND

Technical Field

One disclosed aspect of the embodiments relates to a system that can display a High Dynamic Range (HDR) image.

Description of the Related Art

Display apparatuses that can display a wider dynamic range than a conventional dynamic range have appeared. The dynamic range that can be expressed by conventional display apparatuses is called Standard Dynamic Range (SDR), and the dynamic range wider than the dynamic range that can be expressed by conventional display apparatuses is called HDR. Regarding the SDR, the standard, by the International Telecommunication Union (ITU), called RECOMMENDATION ITU-R BT.709 (hereinafter referred to as ITU BT.709) defines that processing is to be performed with a quantization level of eight bits or more. Regarding the HDR, the standard, by the Society of Motion Picture and Television Engineers (SMPTE), called SMPTE STANDARD 2084 (hereinafter referred to as SMPTE ST 2084) defines that multi-bit processing is to be processed with at least ten bits. HDR processing employs a greater number of bits than SDR processing because, if the quantization level is of the same number of bits as that of the SDR, the tonal range assigned to one bit is wide, and a tonal failure such as a pseudo contour is likely to occur.

Japanese Patent No. 4941285 discloses a technique for performing HDR display of a realistic image using multi-bit high-precision data.

By the way, in mirrorless cameras and the like, optical viewfinders (OVFs) have been replaced with electronic viewfinders (EVFs). OVFs have an HDR display that has characteristics similar to the human visual characteristics, whereas current EVFs cannot perform HDR display. This is because multi-bit processing required by the HDR causes an increase in power consumption, heat generation, an increase in costs, and so on due to an increase in circuit scale, and is difficult to be employed in a small device such as an EVF.

In addition, current EVFs do not have sufficient resolution and frame rate, and regarding bandwidth allocation for an external data transmission line that connects an image processing engine and an EVF, resolution and frame rate are prioritized over tonal improvement according to the HDR that requires an increased number of bits. Therefore, at present, 8-bit SDR images generated by an image processing engine are output to an EVF through an external data transmission line, and it is difficult to perform HDR display without causing a tonal failure.

SUMMARY

An embodiment has been made in consideration of the aforementioned problems, and realizes techniques for enabling a display apparatus to perform HDR display without performing multi-bit processing required by the HDR.

In order to solve the aforementioned problems, the disclosure provides an image generation apparatus which outputs image data to a display apparatus that includes a display device that is capable of displaying an HDR image or an SDR image through an external data transmission line. The image generation apparatus includes a processor and a memory. The memory is coupled to the processor and stores instructions that, when executed by the processor, cause the processor to function as a light emission characteristic inverse conversion unit and a transmission unit. The light emission characteristic inverse conversion unit is configured to perform inverse conversion on image data with respect to light emission characteristics of the display device. The transmission unit is configured to transmit the image data generated by the light emission characteristic inverse conversion unit to the display apparatus through the external data transmission line. The transmission is performed in a case where light emission characteristics of the display device approximate an Electro-Optical Transfer Function (EOTF) of the HDR, a bit precision of image data that is output from the image generation apparatus is no lower than a bit precision of the external data transmission line, and an image of the HDR is to be displayed on the display device.

In order to solve the aforementioned problems, the disclosure provides an image generation apparatus which outputs image data to a display apparatus that includes a display device that is capable of displaying an HDR image or an SDR image through an external data transmission line. The image generation apparatus includes a processor and a memory. The memory is coupled to the processor and stores instructions that, when executed by the processor, cause the processor to function as an HDR Optical-Electro Transfer Function (OETF) conversion unit, and a transmission unit. The HDR OETF conversion unit is configured to perform conversion on image data based on an OETF of an HDR. The transmission unit is configured to transmit the image data generated by the HDR OETF conversion unit to the display apparatus through the external data transmission line. The transmission is performed in a case where the light emission characteristics of the display device approximate an EOTF of the HDR, a bit precision of image data that is output from the image generation apparatus is no lower than a bit precision of the external data transmission line, and an image of the HDR is to be displayed on the display device.

In order to solve the aforementioned problems, the disclosure provides a method of controlling an image generation apparatus which outputs image data to a display apparatus that includes a display device that is capable of displaying an HDR image or an SDR image through an external data transmission line/ The method includes performing inverse conversion on image data with respect to light emission characteristics of the display device and transmitting the image data that has undergone the inverse conversion to the display apparatus through the external data transmission line. The transmission is performed in a case where the light emission characteristics of the display device approximate an EOTF of the HDR, a bit precision of image data that is output from the image generation apparatus is no lower than a bit precision of the external data transmission line, and an image of the HDR is to be displayed on the display device.

In order to solve the aforementioned problems, the disclosure provides a non-transitory computer-readable storage medium storing a program for causing a processor to execute a method of controlling an image generation apparatus which outputs image data to a display apparatus that includes a display device that is capable of displaying an HDR image or an SDR image through an external data transmission line. The method includes performing inverse conversion on image data with respect to light emission characteristics of the display device and transmitting the image data that has undergone the inverse conversion to the display apparatus through the external data transmission line. The transmission is performed in a case where the light emission characteristics of the display device approximate an EOTF of the HDR, a bit precision of image data that is output from the image generation apparatus is no lower than a bit precision of the external data transmission line, and an image of the HDR is to be displayed on the display device.

According to the disclosure, a display apparatus is enabled to perform HDR display without performing multi-bit processing required by the HDR.

Further features of the disclosure will become apparent from the following description of exemplary embodiments (with reference to the attached drawings).

BRIEF DESCRIPTION OF THE DRAWINGS

FIG. 10 is a diagram illustrating OETF conversion and tonal assignment that are performed on the luminance levels of an input image.

DESCRIPTION OF THE EMBODIMENTS

Figure 1:
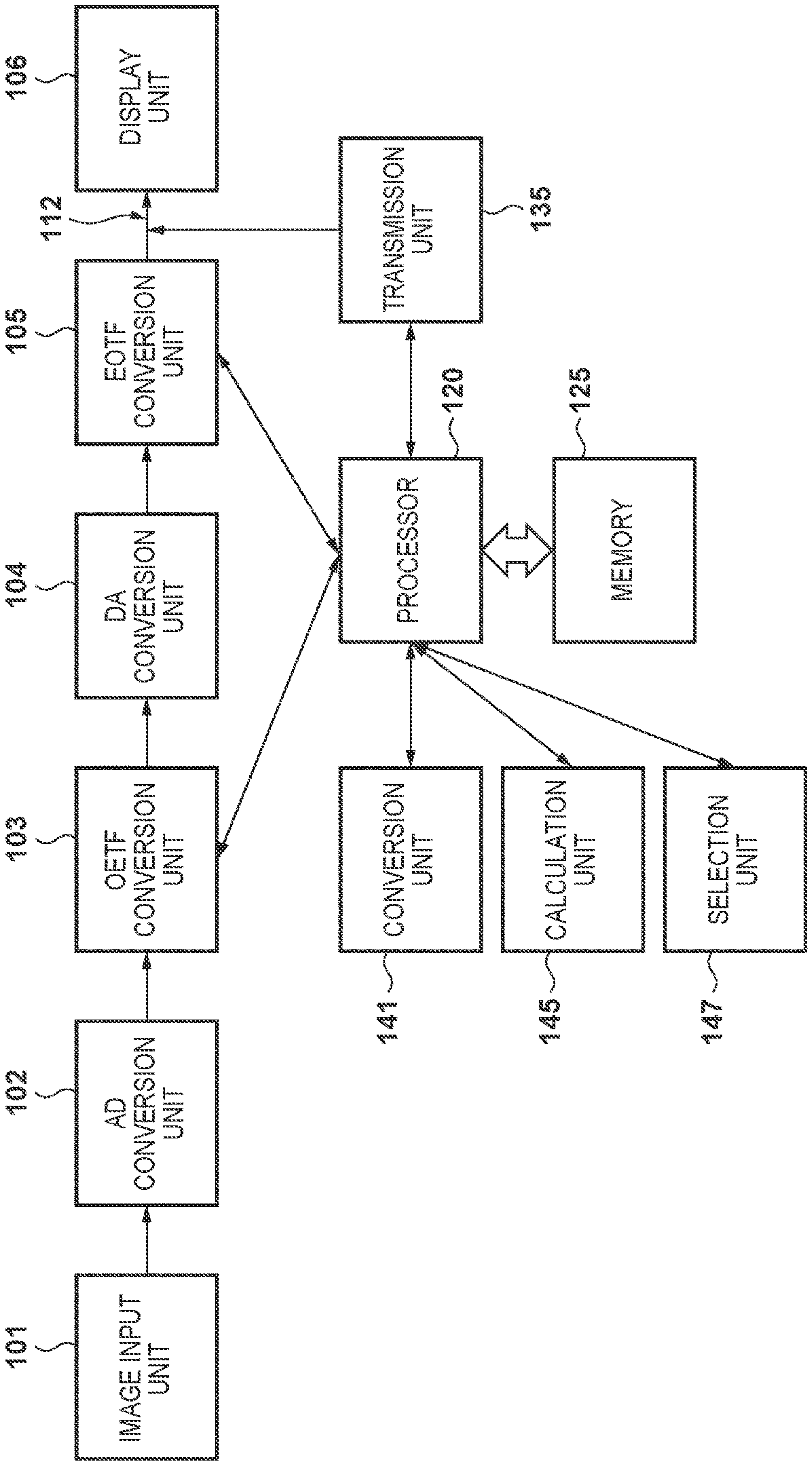
FIG. 1 is a block diagram illustrating a configuration of a display system according to an example that is comparable to an embodiment.

Hereinafter, embodiments will be described in detail with reference to the attached drawings. Note, the following embodiments are not intended to limit the scope of the disclosure. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

Comparable Example

First, a display system according to an example that is comparable to an embodiment.

FIG. 1 shows a configuration of a display system according to an example that is comparable to an embodiment, and a flow of processing from image input to image display. The system includes an image input unit or image sensor 101, AD conversion unit or converter 102, OETF conversion unit 103, a DA conversion unit or converter 104, an EOTF conversion unit 105, a display unit or device 106, a processor 120 and a memory 125 coupled to the processor 120. The memory 125 stores a program or instructions that, when executed by the processor 120, cause the processor 120 to perform operations that correspond to functional units. The functional units may include a transmission unit 135, a conversion unit 141, a calculation unit 145, a selection unit 147, and other conversion or calculation units as necessary. The conversion unit 141 may include various conversion functions such as light emission characteristic inverse conversion, a color gamut conversion, a gamma conversion, and an inverse gamma conversion. The calculation unit 145 may include various calculation functions such as color gamut calculation and gain calculation. The selection unit 147 may perform various image selection functions. The transmission unit 135 is configured to transmit the image data generated by the light emission characteristic inverse conversion unit 141 to the display apparatus or device 106 through an external data transmission line 112.

Figure 8:
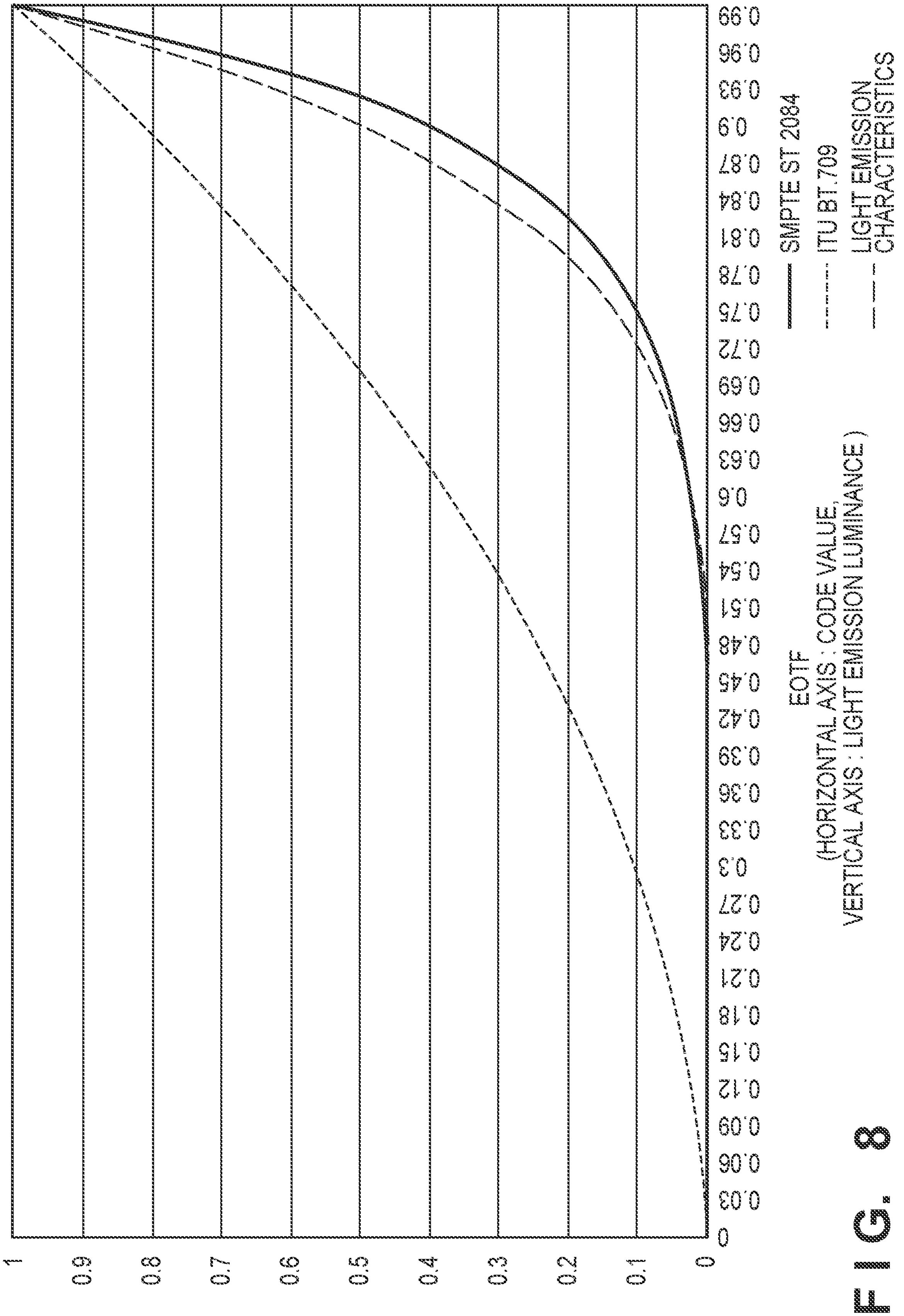
FIG. 8 is a diagram illustrating EOTFs.
Figure 9:
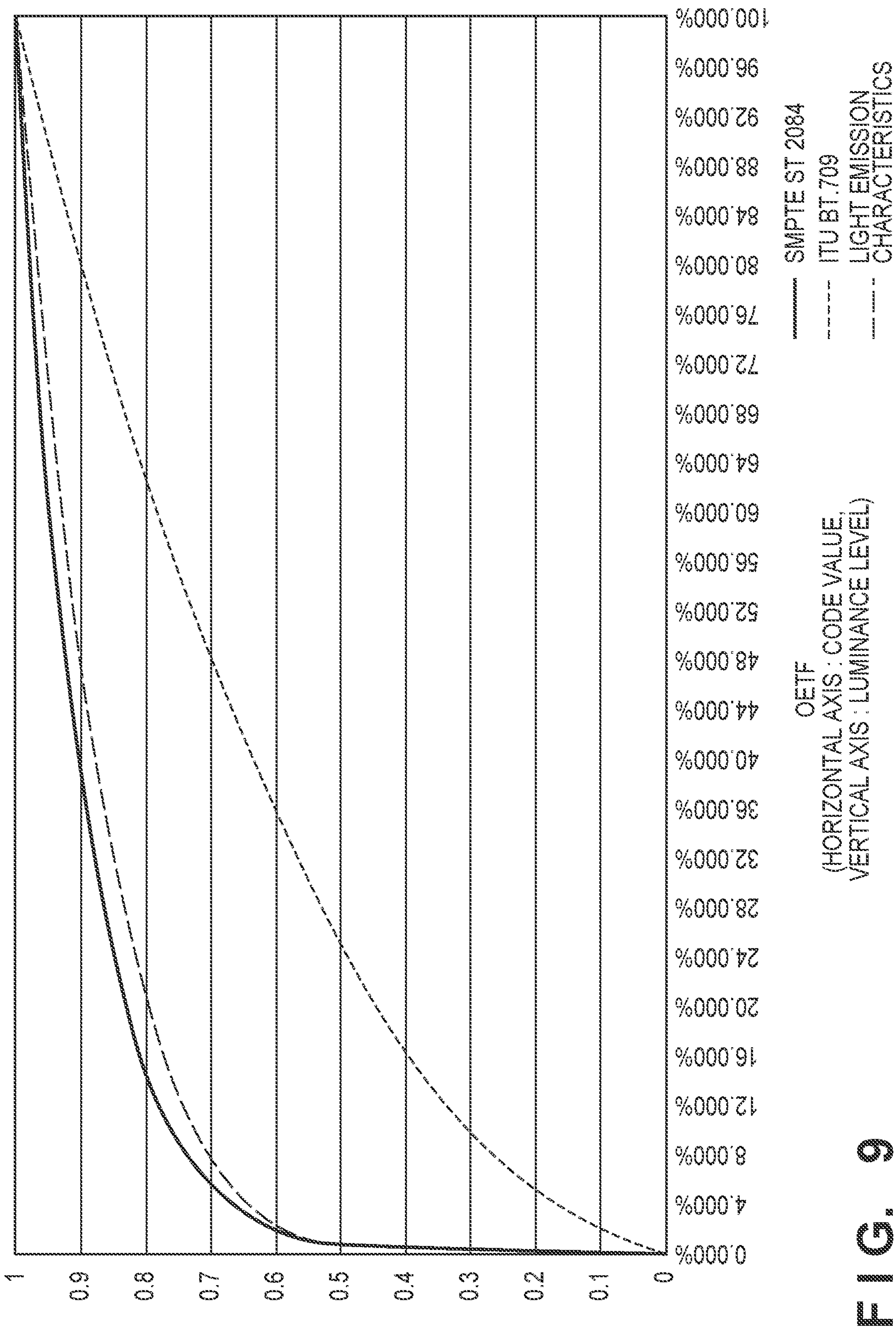
FIG. 9 is a diagram illustrating OETFs.

Analog image data input from the image input unit, or an imaging sensor 101 is converted by the Analog-to-Digital (AD) converter or conversion unit 102 into digital data. The image data converted into digital data is subjected to OETF conversion that is performed by the OETF conversion unit 103. The OETF conversion unit may be a hardware circuit or a functional unit, a module, or an application that is performed by the processor 120 when executing a program stored in the memory 125. The image data that has undergone OETF conversion is converted by the Digital-to-Analog (DA) converter or conversion unit 104 into analog data, and the analog data is subjected to EOTF conversion that is performed by the EOTF conversion unit 105. The EOTF is a transfer function having the code value of the electrical data representing the picture or video signal as input and converting it into a light emission luminance, or a light output, of the display. FIG. 8 shows some examples of the EOTF. The OETF is a transfer function having the scene light, or the image data, as input and converting it into code values representing a picture or video signal as output. FIG. 9 shows some examples of the OETF. OETF conversion and EOTF conversion are inverse conversion of each other. The image data that has undergone EOTF conversion is displayed on the display unit or device 106. With such a configuration and such a processing flow, the same data as the image data input from the image input unit 101 is displayed on the display unit 106.

The display unit or device 106 is formed using a cathode-ray tube, a Liquid Crystal Display (LCD), or a display material such as an organic Electro Luminescence (EL). The display unit/device 106 has unique light emission characteristics depending on the material and configuration thereof. The cathode-ray tube material has light emission characteristics similar to an EOTF defined in ITU BT.709. On the other hand, regarding the display unit/device 106, EOTFs that are based on human perception is defined in SMPTE ST 2084. The EOTF conversion unit 105 converts the image data input thereto, using an EOTF corresponding to the light emission characteristics of the display unit/device 106. When an image is to be displayed on the display unit/device 106, EOTF conversion is to be performed on image data according to the light emission characteristics of the display unit/device 106, and therefore the input image is beforehand subjected to OETF conversion that is the inverse conversion of EOTF conversion, performed by the OETF conversion unit 103.

FIG. 8 is a diagram illustrating the respective EOTFs of SMPTE ST 2084, ITU BT.709, and the light emission characteristics of an organic EL material. In FIG. 8, the vertical axis indicates the light emission luminance that is the output from the EOTFs, and the horizontal axis indicates the code value of the electrical input data that is the input to the EOTFs. The light emission characteristics of the organic EL material draw a curve that is very similar to the curve of SMPTE ST 2084. The light emission characteristics of the organic EL material largely depend on the switching characteristics of the transistor that allows a current to flow through the display material, and have the characteristics with which the light emission luminance increases sharply from a certain threshold value.

FIG. 9 is a diagram illustrating the respective OETFs of SMPTE ST 2084, ITU BT.709, and the light emission characteristics of an organic EL material. The OETFs shown in FIG. 9 are the inverse functions of the EOTFs shown in FIG. 8. In FIG. 9, the vertical axis indicates code values that are the outputs from the OETFs, and the horizontal axis indicates image data output from the AD conversion unit 102, as a value converted into a percentage. The output value from the AD conversion unit 102 has a linear relationship with the luminance level of the object.

FIG. 10 illustrates tonal assignment when outputs from the OETF conversion unit 103 have eight bits and 256 tonal levels, for values obtained by converting the luminance levels of the input image data into percentages. In human perception (vision), the tonal discrimination ability is higher for a dark part than for a bright part. Therefore, according to SMPTE ST 2084, pieces of tonal data indicating 0 to 130 are assigned to the input luminance levels no higher than 1%. In the OETF conversion according to SMPTE ST 2084, code values are evenly distributed in a range from a dark part to a bright part, considering human perception. Therefore, a tonal failure is less likely to occur even if the input range is increased. For this reason, the SMPTE ST 2084 is used as an OETF for HDR.

In contrast, in ITU BT.709, only piece of tonal data from 0 to 11 are assigned to input luminance levels no higher than 1%. Therefore, if the input range is increased, a tonal failure in a dark part becomes prominent. ITU BT.709 is used as an OETF for SDR that has a narrower input range than HDR. The light emission characteristics of the organic EL material are similar to the characteristics of SMPTE ST 2084. This means that human perception and the light emission characteristics of organic EL materials are similar to each other.

The following describe an example of a system applied to an image capture apparatus such as a camera, which serves as an image generation apparatus, and an EVF of a camera, which serves as a display apparatus. However, the disclosure is not limited to such an example.

First Embodiment

The following describes a first embodiment.

Figure 2A:
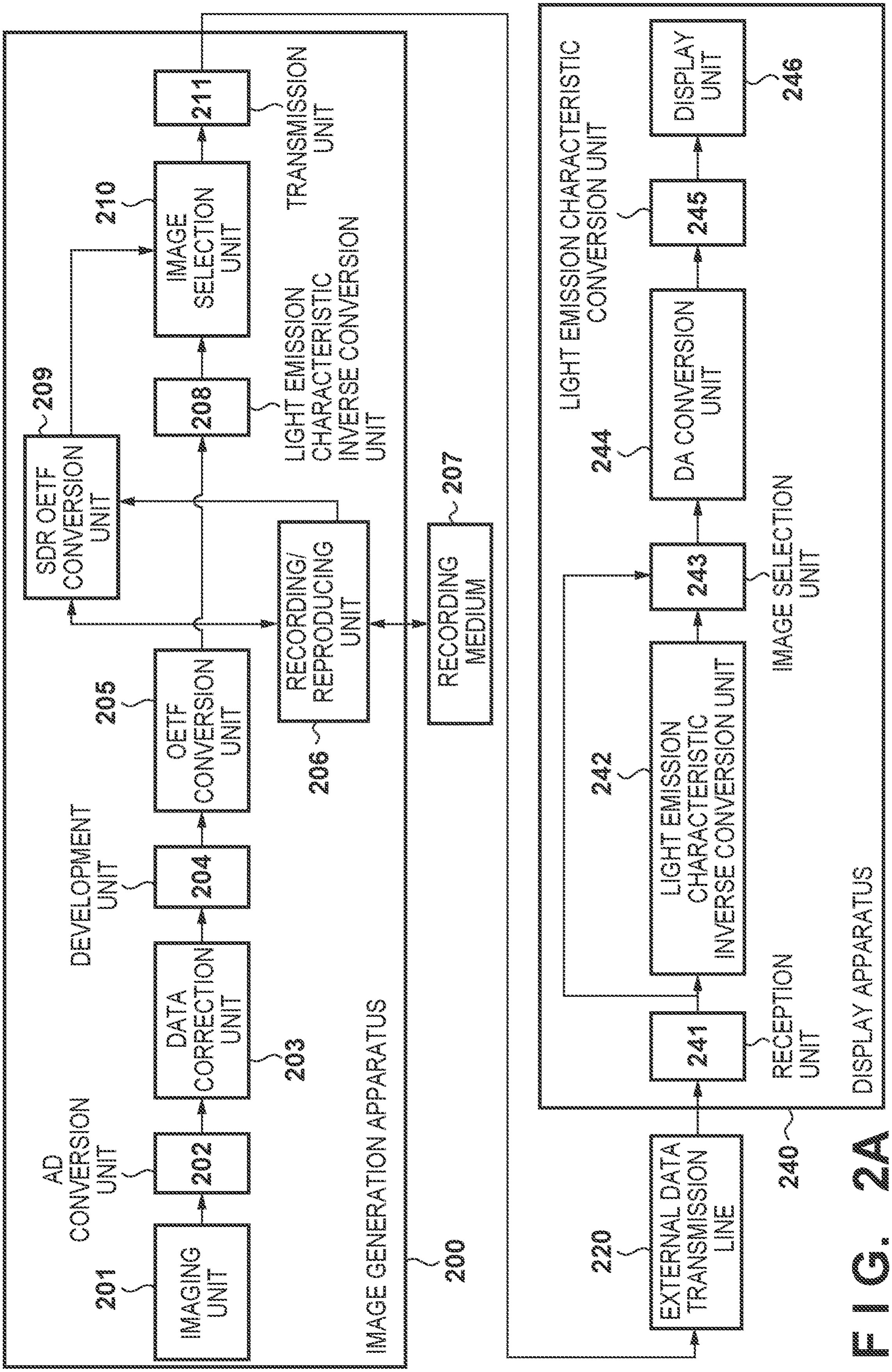
FIG. 2A is a block diagram illustrating a configuration of a display system according to a first embodiment.

FIG. 2A is a block diagram illustrating a configuration of a display system according to the first embodiment.

The system according to the first embodiment includes an image generation apparatus 200, an external data transmission line 220 with a bit precision of ten bits or lower, and a display apparatus 240. In the image generation apparatus 200, an imaging unit 201 acquires imaging data. The imaging data acquired by the imaging unit 201 is converted by an AD conversion unit 202 from analog data to digital data, and deficiencies in the digital imaging data generated by the image sensor, such as scratches and unevenness, are corrected by a data correction unit 203. The imaging data corrected by the data correction unit 203 is converted by a development unit 204 into image data, and the image data is converted by an OETF conversion unit 205 into an OETF that conform to a standard such as ITU BT.709 or SMPTE ST 2084. The image data that has undergone OETF conversion is recorded by a recording/reproducing unit 206 onto a recording medium 207.

The light emission characteristic inverse conversion unit 208 performs inverse conversion of the conversion performed by the light emission characteristic conversion unit 245 corresponding to the display unit/device 246. The light emission characteristic inverse conversion unit 208 performs light emission characteristic inverse conversion on the image data that has undergone the OETF conversion performed by the OETF conversion unit 205. An SDR OETF conversion unit 209 performs OETF conversion according to the SDR when the image data output from the OETF conversion unit 205 is image data that has undergone OETF conversion according to the HDR. On the other hand, the data read out from the recording medium 207 is reproduced by the recording/reproducing unit 206 as image data. The light emission characteristic inverse conversion unit 208 performs light emission characteristic inverse conversion on the image data reproduced by the recording/reproducing unit 206. Also, if the reproduced image data is image data that has undergone OETF conversion according to the HDR, the SDR OETF conversion unit 209 performs OETF conversion according to the SDR.

An image selection unit 210 (in the selection unit 147 shown in FIG. 1) selects either the image data generated by the light emission characteristic inverse conversion unit 208 or the image data generated by the SDR OETF conversion unit 209. The image data selected by the image selection unit 210 is output by a transmission unit 211 to an external device via the image generation apparatus 200. The image data output from the image generation apparatus 200 is input to the display apparatus 240 through the external data transmission line 220. The external data transmission line 220 is a data transmission line exclusively for image data, and may conform to Mobile Industry Processor Interface (MIPI®), Low Voltage Differential Signaling (LVDS), subLVDS, High-Definition Multimedia Interface (HDMI®), DisplayPort®, or Serial Digital Interface (SDI), for example.

The display apparatus 240 receives the image data output from the image generation apparatus 200 through the external data transmission line 220, via a reception unit 241. A light emission characteristic inverse conversion unit 242 performs inverse conversion corresponding to the light emission characteristics of the display unit/device 246, on the image data received from the reception unit 241. If the image selection unit 210 of the image generation apparatus 200 has selected the image data generated by the SDR OETF conversion unit 209, an image selection unit 243 (in the selection unit 147 shown in FIG. 1) selects the image data generated by the light emission characteristic inverse conversion unit 242. If the image selection unit 210 of the image generation apparatus 200 has selected the image data generated by the light emission characteristic inverse conversion unit 208, the image selection unit 243 selects the image data received by the reception unit 241. The image data output from the image selection unit 243 is converted by a DA conversion unit 244 from digital data to analog data. The analog data converted by the DA conversion unit 244 is converted by a light emission characteristic conversion unit 245 so as to have light emission characteristics corresponding to the display unit/device 246, and is displayed on the display unit/device 246.

Figure 2B:
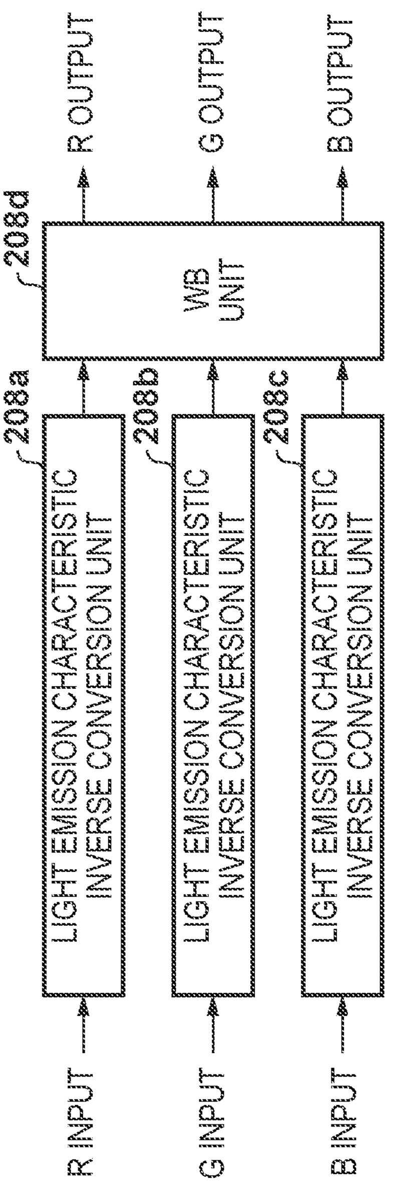
FIG. 2B is a block diagram showing a configuration of a light emission characteristic inverse conversion unit at the time of RGB input.

Next, processing that is performed by the light emission characteristic inverse conversion unit 208 and the light emission characteristic inverse conversion unit 242 will be described with reference to FIG. 2B. Although FIG. 2B shows an example in which each pixel of the display unit/device 246 is constituted by R, G, and B, the same applies to cases in which each pixel is constituted by another combination such as C, M, and Y. The R, G, and B pixels each have their unique light emission characteristics, and therefore light emission characteristic inverse conversion units 208*a*, 208*b*, and 208*c* respectively perform light emission characteristic inverse conversion on R, G, and B. The RGB data that has undergone light emission characteristic inverse conversion is output after undergoing white balance adjustment that is performed by a White Balance (WB) unit 208*d*. The processing order of the light emission characteristic inverse conversion and white balance adjustment may be reversed, and may be performed at the same time.

Figure 2C:
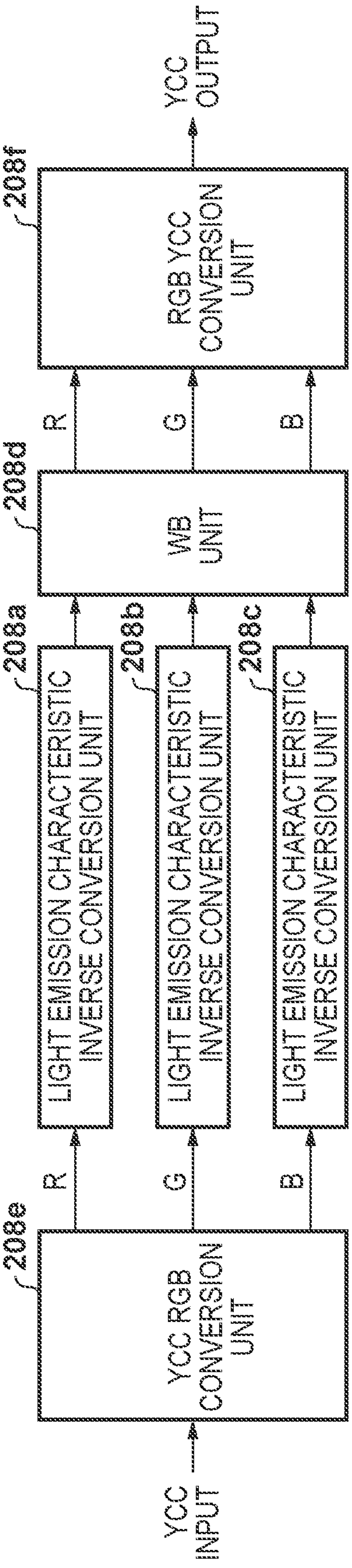
FIG. 2C is a block diagram showing a configuration of a light emission characteristic inverse conversion unit at the time of YCC input.

With reference to FIG. 2C, the following describes processing that is performed by the light emission characteristic inverse conversion unit 208 when the image data input to the light emission characteristic inverse conversion unit 208 is YCC (luminance, color difference) data. A YCC RGB conversion unit 208*e* converts the input YCC data into RGB data. The processing to be performed after the RGB conversion is the same as that in FIG. 2B. The RGB data that has undergone the white balance adjustment performed by the WB unit 208*d* is output after being converted into YCC data by an RGB YCC conversion unit 208*f*.

The light emission characteristic inverse conversion unit 242 of the display apparatus 240 outputs RGB data corresponding to the pixels of the display unit/device 246, and is therefore not provided with the RGB YCC conversion unit 208*f*.

Figure 3:
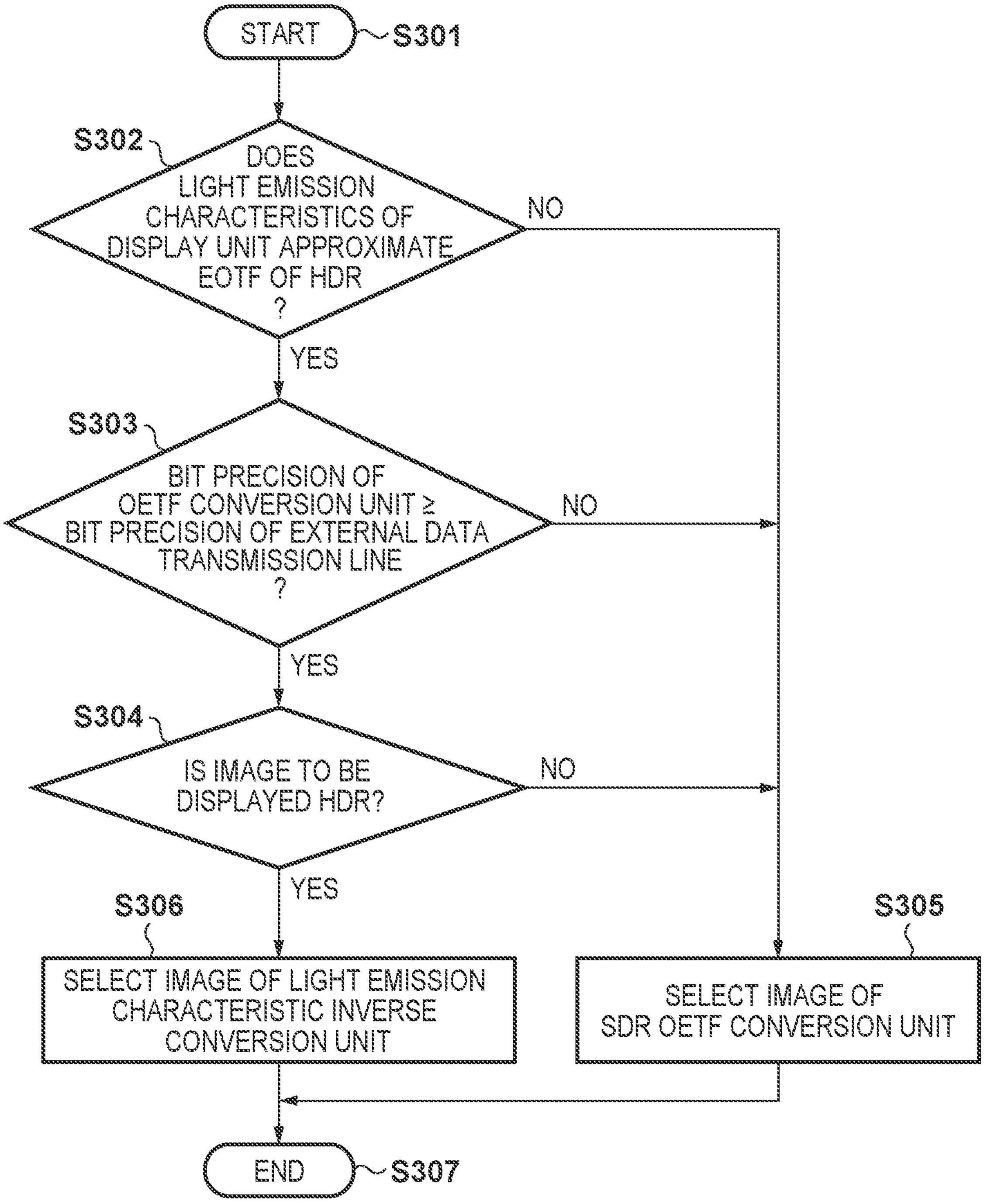
FIG. 3 is a flowchart showing processing that is performed by an image selection unit according to the first embodiment.

The following describes processing procedures through which the image selection unit 210 of the image generation apparatus 200 selects the image data generated by the light emission characteristic inverse conversion unit 208 or the image data generated by the SDR OETF conversion unit 209, with reference to FIG. 3.

FIG. 3 is a flowchart showing processing through which the image selection unit 210 of the image generation apparatus 200 selects the image data generated by the light emission characteristic inverse conversion unit 208 or the image data generated by the SDR OETF conversion unit 209.

After starting processing in step S301, in step S302, the image selection unit 210 performs determination based on the light emission characteristics of the display unit/device 246. In the above description, the EOTF of the HDR is SMPTE ST 2084 and the EOTF of the SDR is ITU BT.709. However, the EOTF of the HDR is not limited to SMPTE ST 2084. If the number of tones allocated to the dark part according to an OETF that is the inverse function of an EOTF is greater than that of the SDR, the EOTF can be the EOTF of the HDR. By definition, when the sum of the squares of the difference between the light emission characteristics of the display unit/device 246 and the EOTF of the HDR is smaller than the sum of the squares of the difference between the light emission characteristics of the display unit/device 246 and the EOTF of the SDR, it is said that the light emission characteristics approximate the EOTF of the HDR.

As described with reference to FIG. 8, the light emission characteristics of the organic EL material approximate the EOTF of the HDR. On the other hand, the light emission characteristics of cathode ray tubes and the like approximate the EOTF of the SDR, and do not approximate the EOTF of the HDR. Therefore, in step S302, upon determining that the light emission characteristics of the display unit/device 246 do not approximate the EOTF of the HDR, the image selection unit 210 selects the image data generated by the SDR OETF conversion unit 209, in step S305. Also, in step S302, upon determining that the light emission characteristics of the display unit/device 246 approximate the EOTF of the HDR, the image selection unit 210 compares the bit precision of the image data generated by the OETF conversion unit 205 and the bit precision of the external data transmission line 220 with each other in step S303. The bit precision does not mean the physical bit width, but the substantial bit width. For example, if 8-bit data is packed in a 10-bit width and the remaining 2 bits are padded with 0, the bit precision is 8-bit precision. In step S303, upon determining that that the bit precision of the image data generated by the OETF conversion unit 205 is smaller than the bit precision of the external data transmission line 220, the image selection unit 210 selects the image data generated by the SDR OETF conversion unit 209, in step S305. Also, in step S303, upon determining that the bit precision of the image data generated by the OETF conversion unit 205 is no lower than the bit precision of the external data transmission line 220, the image selection unit 210 determines whether or not the image to be displayed is the HDR, in step S304. In step S304, upon determining that the image to be displayed is not the HDR, the image selection unit 210 selects the image data generated by the SDR OETF conversion unit 209, in step S305. Also, in step S304, upon determining that the image to be displayed is the HDR, the image selection unit 210 selects the image data generated by the light emission characteristics inverse conversion unit 208, in step S306. Thereafter, processing is terminated in step S307.

FIG. 3 illustrates processing that is performed by the image selection unit 210 to select the image date generated by the light emission characteristic inverse conversion unit 208 or the image data generated by the SDR OETF conversion unit 209. In order to unify the types of OETF of the image data of the external data transmission line 220, or because it is better to use the image generation apparatus 200 rather than the display apparatus 240 to perform processing from the viewpoint of the processing costs of the light emission characteristic inverse conversion, for example, the image selection unit 210 may invariably select the image data generated by the light emission characteristic inverse conversion unit 208.

The determination conditions in steps S302 and S303 in FIG. 3 are determined when the image generation apparatus 200, the external data transmission line 220, and the display apparatus 240 that are the components of the display system are selected, and are not dynamically selected during the operation of the display system.

The image data to be displayed on the display unit/device 246 needs to be subjected to light emission characteristic inverse conversion before DA conversion is performed by the DA conversion unit 244. In the present embodiment, when HDR display in which a tonal failure is likely to occur is to be performed, the image data generated by the OETF conversion unit 205 with a bit precision no lower than that of the external data transmission line 220 is subjected to inverse conversion of the light emission characteristics approximate the OETF of the HDR. As a result, it is possible to reduce the quantization error and the calculation error and minimize the tonal failure in the displayed image.

Second Embodiment

The following describes a second embodiment.

Figure 4:
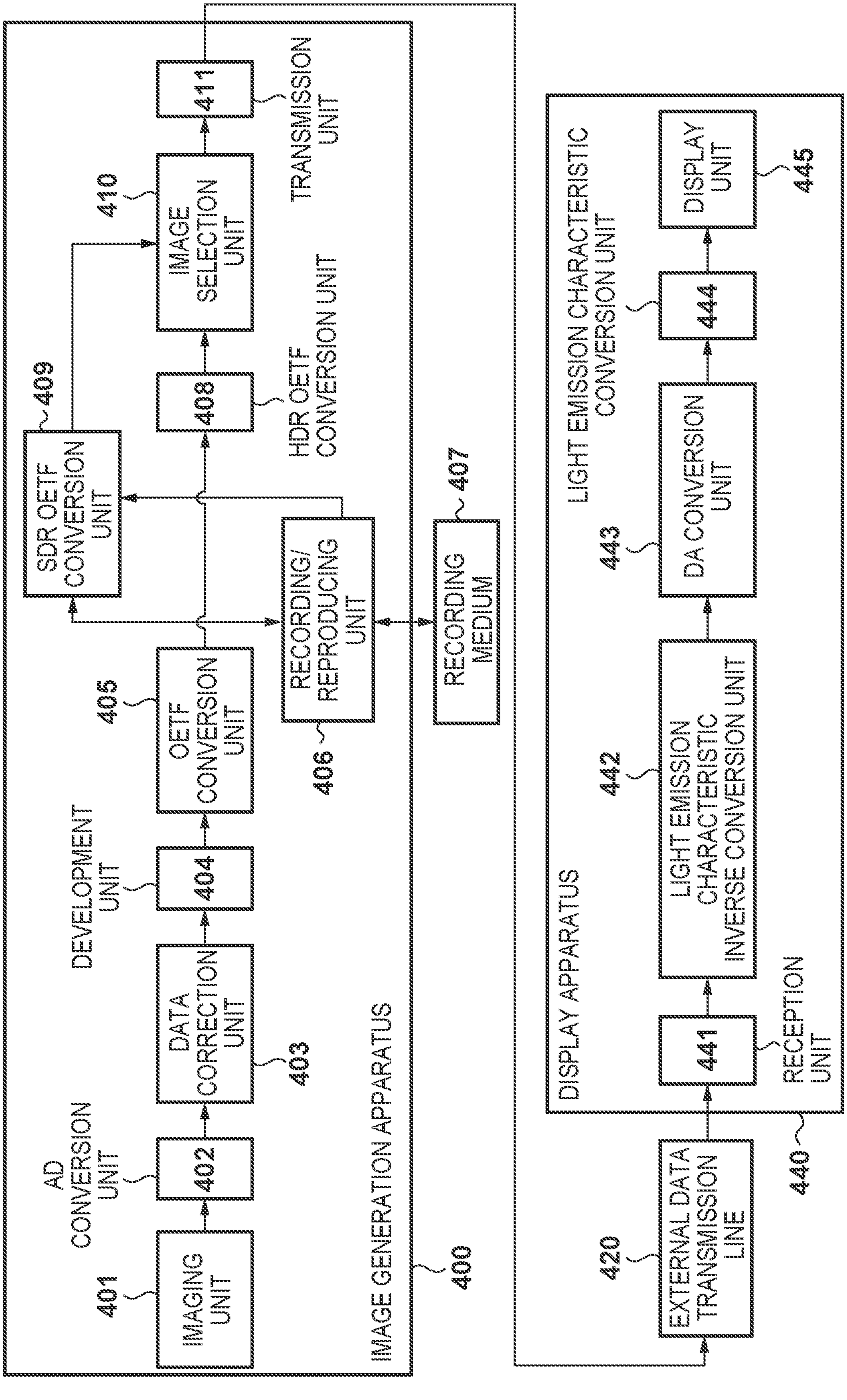
FIG. 4 is a block diagram illustrating a configuration of a display system according to a second embodiment.

FIG. 4 is a block diagram illustrating a configuration of a display system according to the second embodiment.

The system according to the second embodiment includes an image generation apparatus 400, an external data transmission line 420 with a bit precision of ten bits or lower, and a display apparatus 440. In the image generation apparatus 400, an imaging unit 401 acquires imaging data. The imaging data acquired by the imaging unit 401 is converted by an AD conversion unit 402 from analog data to digital data. Deficiencies in the digital imaging data generated by the image sensor, such as scratches and unevenness, are corrected by a data correction unit 403. The imaging data corrected by the data correction unit 403 is converted by a development unit 404 into image data, and the image data is converted by an OETF conversion unit 405 into OETFs that conform to a standard such as ITU BT.709 or SMPTE ST 2084. The image data that has undergone OETF conversion is recorded by a recording/reproducing unit 406 onto a recording medium 407.

An HDR OETF conversion unit 408 performs OETF conversion according to the HDR when the image data output from the OETF conversion unit 405 is image data that has undergone OETF conversion according to the SDR. The SDR OETF conversion unit 409 performs OETF conversion according to the SDR when the image data output from the OETF conversion unit 405 is image data that has undergone OETF conversion according to the HDR. The data read out from the recording medium 407 is reproduced by the recording/reproducing unit 406 as image data. The HDR OETF conversion unit 408 performs OETF conversion according to the HDR when the image data reproduced by the recording/reproducing unit 406 is image data that has undergone OETF conversion according to the SDR. The SDR OETF conversion unit 409 performs OETF conversion according to the SDR when the image data reproduced by the recording/reproducing unit 406 is image data that has undergone OETF conversion according to the HDR.

An image selection unit 410 (in the selection unit 147 shown in FIG. 1) selects either the image data generated by the HDR OETF conversion unit 408 or the image data generated by the SDR OETF conversion unit 409. The image data selected by the image selection unit 410 is output by a transmission unit 411 to an external device via the image generation apparatus 400. The image data output from the image generation apparatus 400 is input to the display apparatus 440 through the external data transmission line 420. The external data transmission line 420 is a data transmission line exclusively for image data, and may conform to MIPI®, LVDS, subLVDS, HDMI®, DisplayPort®, or SDI, for example.

The display apparatus 440 receives image data via a reception unit 441. The image data received by the reception unit 441 is subjected to light emission characteristic inverse conversion that is performed by the light emission characteristic inverse conversion unit 442. The image data that has undergone light emission characteristic inverse conversion is converted by a DA conversion unit 443 from digital data to analog data. The analog data that has undergone the DA conversion performed by the DA conversion unit 443 is converted by a light emission characteristic conversion unit 444 so as to have light emission characteristics corresponding to a display unit/device 445, and is displayed on the display unit/device 445. The light emission characteristic inverse conversion unit 442 performs light emission characteristic inverse conversion and white balance adjustment for each of RGB, conversion from YCC to RGB, or the like as in the processing performed by the light emission characteristic inverse conversion unit 242 shown in FIGS. 2B and 2C.

Figure 5:
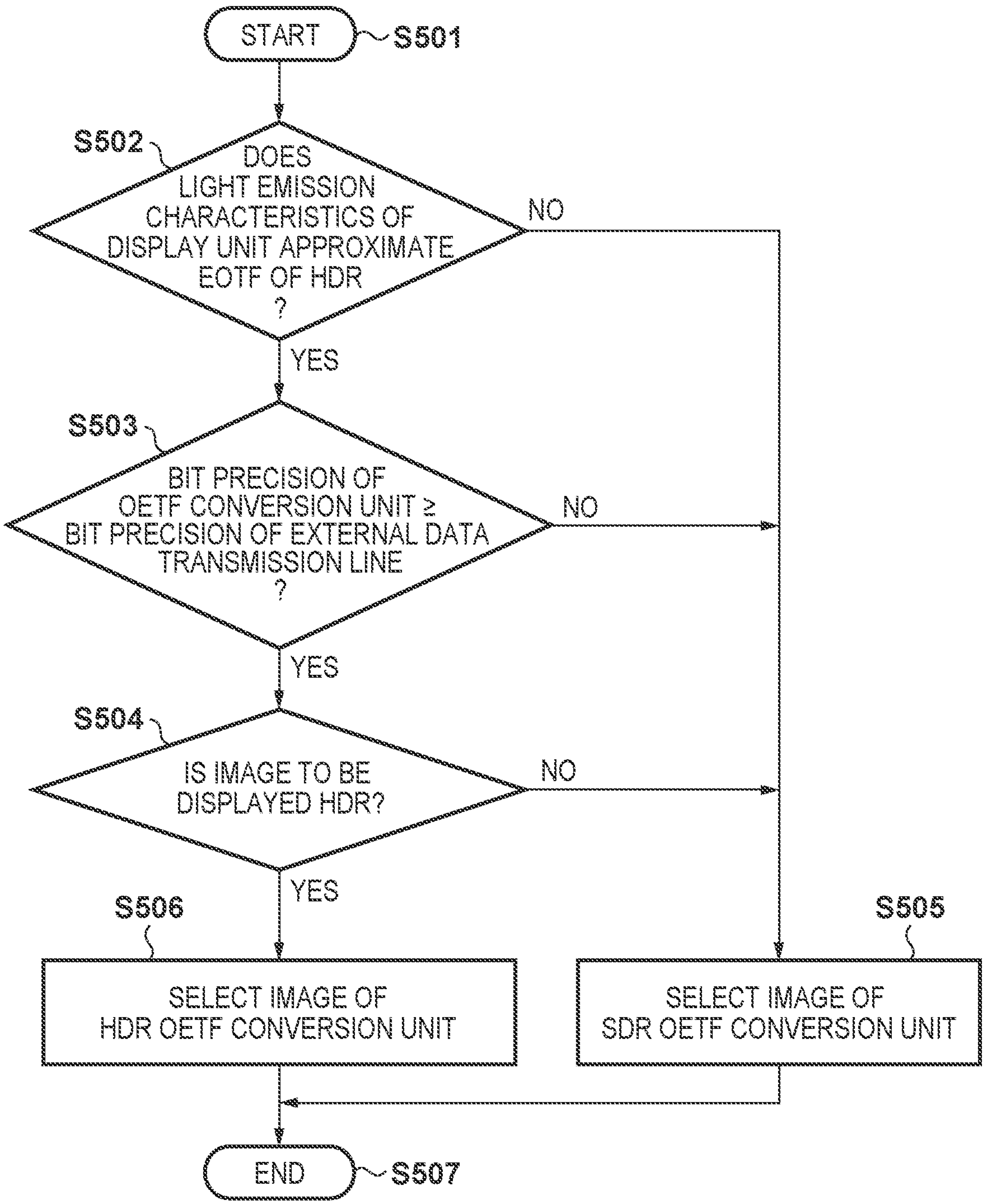
FIG. 5 is a flowchart showing processing that is performed by an image selection unit according to the second embodiment.

The following describes processing procedures through which the image selection unit 410 of the image generation apparatus 400 selects the image data generated by the HDR OETF conversion unit 408 or the image data generated by the SDR OETF conversion unit 409, with reference to FIG. 5.

FIG. 5 is a flowchart showing processing through which the image selection unit 410 of the image generation apparatus 400 selects the image data generated by the HDR OETF conversion unit 408 or the image data generated by the SDR OETF conversion unit 409.

After starting processing in step S501, in step S502, the image selection unit 410 performs determination based on the light emission characteristics of the display unit 445. Upon determining that the light emission characteristics of the display unit 445 do not approximate the EOTF of the HDR, the image selection unit 410 selects the image data generated by the SDR OETF conversion unit 409, in step S505. Also, upon determining that the light emission characteristics of the display unit 445 approximate the EOTF of the HDR, the image selection unit 410 compares the bit precision of the image data generated by the OETF conversion unit 405 and the bit precision of the external data transmission line 420 with each other in step S503. Upon determining that that the bit precision of the output from the OETF conversion unit 405 is smaller than the bit precision of the external data transmission line 420, the image selection unit 410 selects the image data generated by the SDR OETF conversion unit 409, in step S505. Upon determining that the bit precision of the image data generated by the OETF conversion unit 405 is no lower than the bit precision of the external data transmission line 420, the image selection unit 410 determines whether or not the image to be displayed is the HDR, in step S504. Upon determining that the image to be displayed is not the HDR, the image selection unit 410 selects the image data generated by the SDR OETF conversion unit 409, in step S505. Also, upon determining that the image to be displayed is the HDR, the image selection unit 410 selects the image data generated by the HDR OETF conversion unit 408, in step S506. Thereafter, processing is terminated in step S507.

FIG. 5 illustrates processing that is performed by the image selection unit 410 of the image generation apparatus 400 to select the image date generated by the HDR OETF conversion unit 408 or the image data generated by the SDR OETF conversion unit 409. In order to unify the types of OETF of the image data of the external data transmission line 420, for example, the image selection unit 410 may invariably select the image data generated by the HDR OETF conversion unit 408.

The determination conditions in steps S502 and S503 in FIG. 5 are determined when the image generation apparatus 400, the external data transmission line 420, and the display apparatus 440 that are the components of the display system are selected, and are not dynamically selected during the operation of the display system.

Compared to the first embodiment, the light emission characteristic inverse conversion unit 208 in the second embodiment is replaced with the HDR OETF conversion unit 408. While EOTFs such as ITU BT.709 are standardized considering the light emission characteristics of cathode ray tubes and so on, EOTFs that take the light emission characteristics of organic EL and so on have not been standardized. The light emission characteristics of the display material change depending on environmental differences such as the temperature of the display unit 445 and the applied voltage and differences between individual display units, and therefore it is necessary to correct such differences. The image generation apparatus 400 is connected to the display apparatus 440 through the external data transmission line 420, and the image generation apparatus 400 and the display apparatus 440 are independent of each other and can be selected and combined from a plurality of image generation apparatuses and a plurality of display apparatuses. Considering such combinations, it may be easier to control the correction of the light emission characteristics that depend on the display material of the display unit 445 by using the display apparatus. That is to say, there may be a case in which inverse conversion on the light emission characteristics of the display unit 445 is to be performed by using the display apparatus 440, and the image data transmitted through the external data transmission line 420 is desired to be data conforming to the existing standard. In such a case, it is possible to reduce the quantization error and the calculation error of the inverse conversion performed by the display apparatus 400 on the light emission characteristics, and to minimize the tonal failure in the display image, by selecting an HDR OETF that approximates the light emission characteristics of an organic EL, for example.

Third Embodiment

The following describes a third embodiment.

Figure 6:
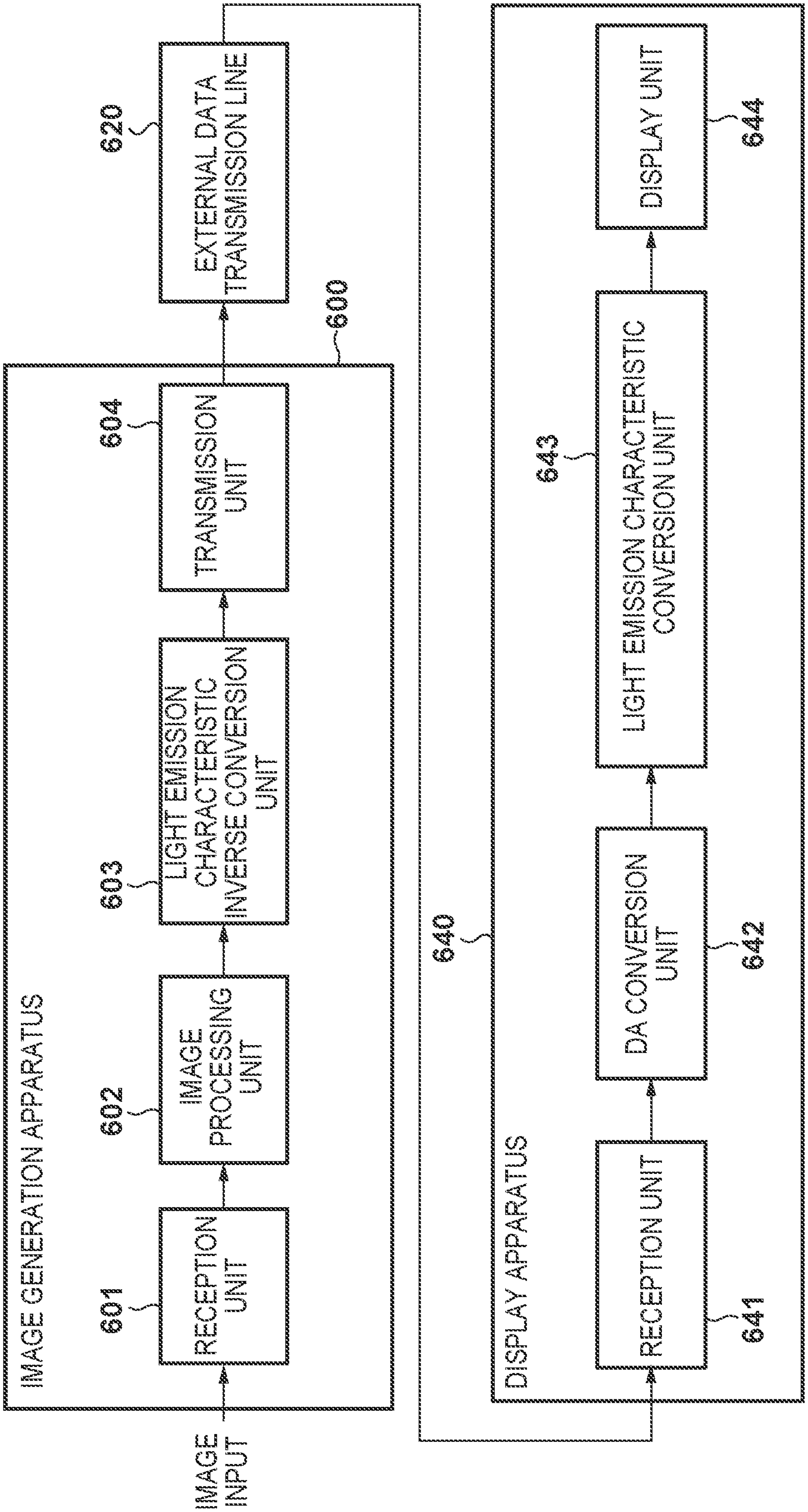
FIG. 6 is a block diagram illustrating a configuration of a display system according to a third embodiment.

FIG. 6 is a block diagram illustrating a configuration of a display system according to the third embodiment.

The system according to the third embodiment includes an image generation apparatus 600, an external data transmission line 620 with a bit precision of ten bits or lower, and a display apparatus 640. The image generation apparatus 600 receives image data input from an external device, via a reception unit 601. An image processing unit 602 performs image processing on the image data received by the reception unit 601. For example, if the display system of the present embodiment displays a display image through a lens connected to the output stage of a display unit/device 644 like Virtual Reality (VR) glasses or electronic binoculars do, distortion of the lens may be corrected. Such lens distortion correction is performed by the image processing unit 602. The data that has undergone image processing is subjected to inverse conversion performed by a light emission characteristic inverse conversion unit 603, which is the inverse conversion of the conversion performed by a light emission characteristic conversion unit 643 based on the display unit 644 of the display apparatus 640. The image data that has undergone light emission characteristic inverse conversion is output by a transmission unit 604 from the image generation apparatus 600 to an external device. The image data output by the transmission unit 604 is input to the display apparatus 640 through the external data transmission line 620. The external data transmission line 620 is a data transmission line exclusively for image data, and may conform to MIPI®, LVDS, subLVDS, HDMI®, DisplayPort®, or SDI, for example.

The display apparatus 640 receives image data via a reception unit 641. The image data received by the reception unit 641 is converted by a DA conversion unit 642 from digital data to analog data. The analog data converted by the DA conversion unit 642 is converted by the light emission characteristic conversion unit 643 so as to have light emission characteristics corresponding to the display unit 644, and is displayed on the display unit 644.

As described above, even if the display system of the present embodiment displays a display image through a lens connected to the output stage of the display unit 644 like VR glasses or electronic binoculars do, it is possible to correct distortion of the lens and minimize the tonal failure in HDR display.

Fourth Embodiment

The following describes a fourth embodiment.

Figure 7:
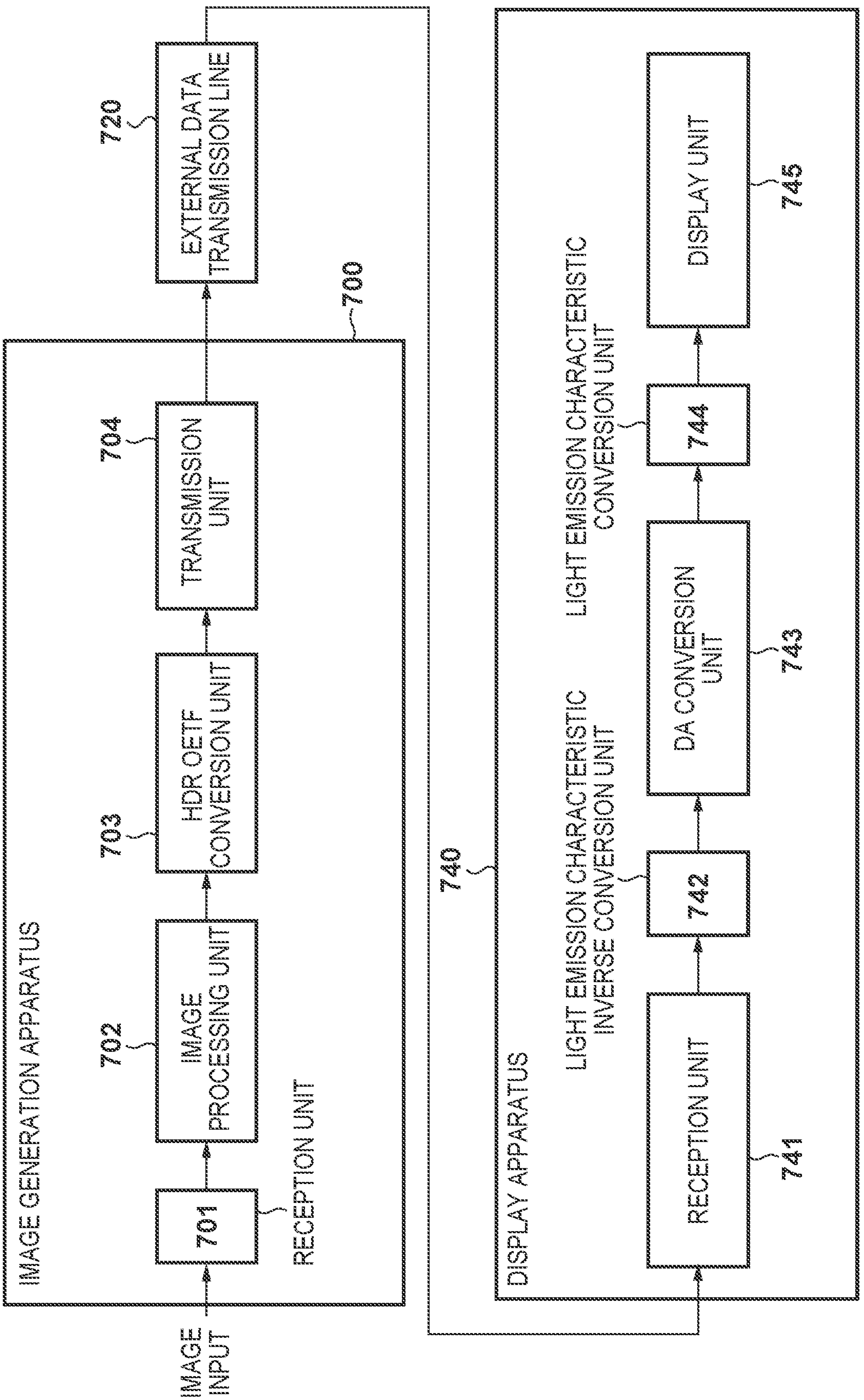
FIG. 7 is a block diagram illustrating a configuration of a display system according to a fourth embodiment.

FIG. 7 is a block diagram illustrating a configuration of a display system according to the fourth embodiment.

The system according to the fourth embodiment includes an image generation apparatus 700, an external data transmission line 720 with a bit precision of ten bits or lower, and a display apparatus 740. The image generation apparatus 700 receives image data input from an external device, via a reception unit 701. An image processing unit 702 performs image processing on the image data received by the reception unit 701. The image data that has undergone image processing is converted into the OETF of the HDR by an HDR OETF conversion unit 703. The image data converted into the OETF of the HDR is output by a transmission unit 704 from the image generation apparatus 700 to an external device. The image data output by the transmission unit 704 is input to the display apparatus 740 through the external data transmission line 720. The external data transmission line 720 is a data transmission line exclusively for image data, and may conform to MIPI®, LVDS, subLVDS, HDMI®, DisplayPort®, or SDI, for example.

The display apparatus 740 receives the image data via a reception unit 741. The image data received by the reception unit 741 is subjected to light emission characteristic inverse conversion that is performed by the light emission characteristic inverse conversion unit 742. The image data that has undergone light emission characteristic inverse conversion is converted by a DA conversion unit 743 from digital data to analog data. The analog data converted by the DA conversion unit 743 is converted by a light emission characteristic conversion unit 744 so as to have light emission characteristics corresponding to a display unit/device 745, and is displayed on the display unit/device 745.

Compared to the third embodiment, the light emission characteristic inverse conversion unit 603 in the fourth embodiment is replaced with the HDR OETF conversion unit 703. As described above, even if the display system of the present embodiment displays a display image through a lens connected to the output stage of the display unit 644 like VR glasses or electronic binoculars do, it is possible to correct distortion of the lens and minimize the tonal failure in HDR display.

The present embodiment is effective when, in a display system like the third embodiment, inverse conversion on the light emission characteristics of the display unit 745 is to be performed by using the display apparatus 740, and the image data transmitted through the external data transmission line 720 is desired to be data conforming to the existing standard.

Fifth Embodiment

The following describes a fifth embodiment.

Figure 11:
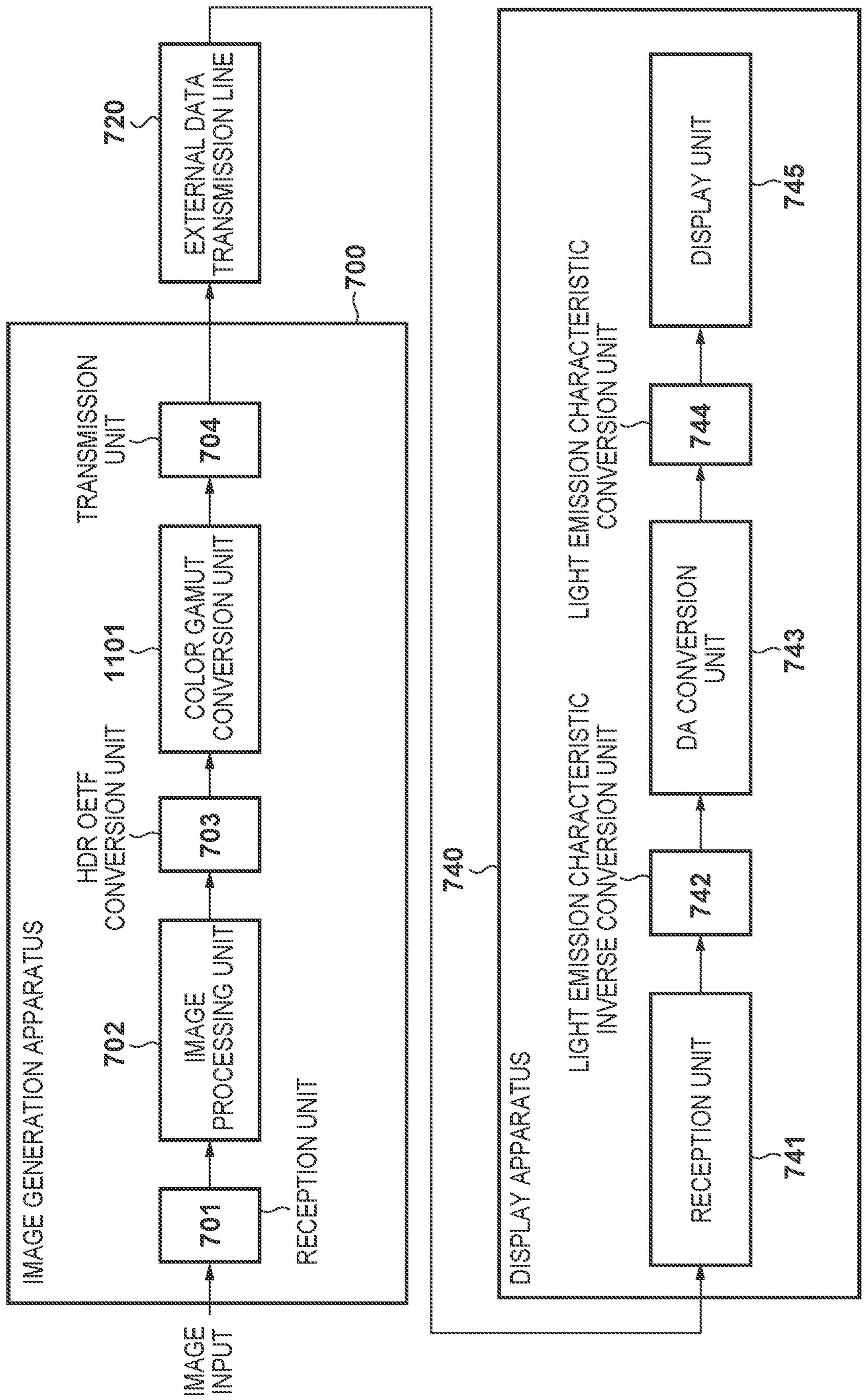
FIG. 11 is a block diagram illustrating a configuration of a display system according to a fifth embodiment.

FIG. 11 is a block diagram illustrating a configuration of a display system according to the fifth embodiment.

Figure 12:
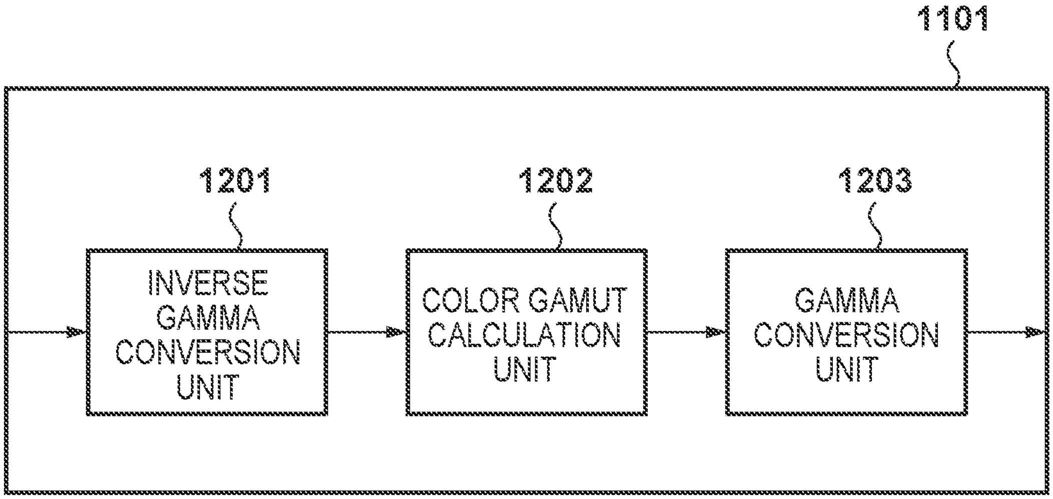
FIG. 12 is a block diagram illustrating an HDR OETF conversion unit.

The system according to the fifth embodiment includes an image generation apparatus 700 that can perform processing with a bit precision of no lower than ten bits, an external data transmission line 720 with a bit precision of ten bits or lower, and a display apparatus 740 that is compatible with the SDR standard compliant color gamut (ITU BT.709). The image generation apparatus 700 receives image data input from an external device, via a reception unit 701. An image processing unit 702 performs image processing on the image data received by the reception unit 701. The image data that has undergone image processing is converted into the OETF of the HDR by an HDR OETF conversion unit 703. A color gamut conversion unit 1101 performs conversion to a color gamut that matches the display capabilities of the display apparatus 740, at a bit precision of the external data transmission line 720. As shown in FIG. 12, the color gamut conversion unit 1101 includes an inverse gamma conversion unit 1201, a color gamut calculation unit 1202, and a gamma conversion unit 1203.

Figure 13:
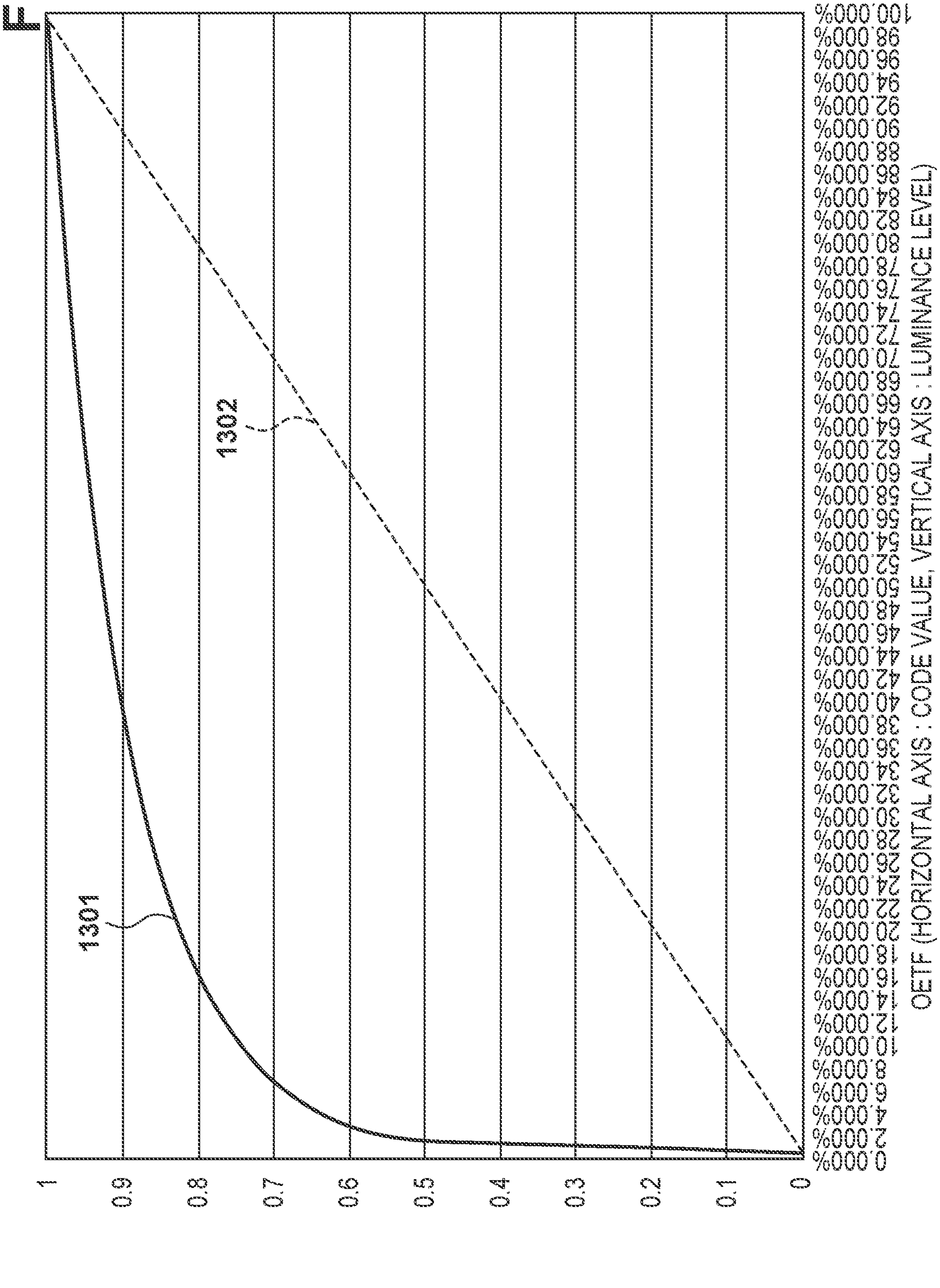
FIG. 13 is a diagram illustrating an OETF according to the SMPTE ST 2084 and a linear OETF.
Figure 14:
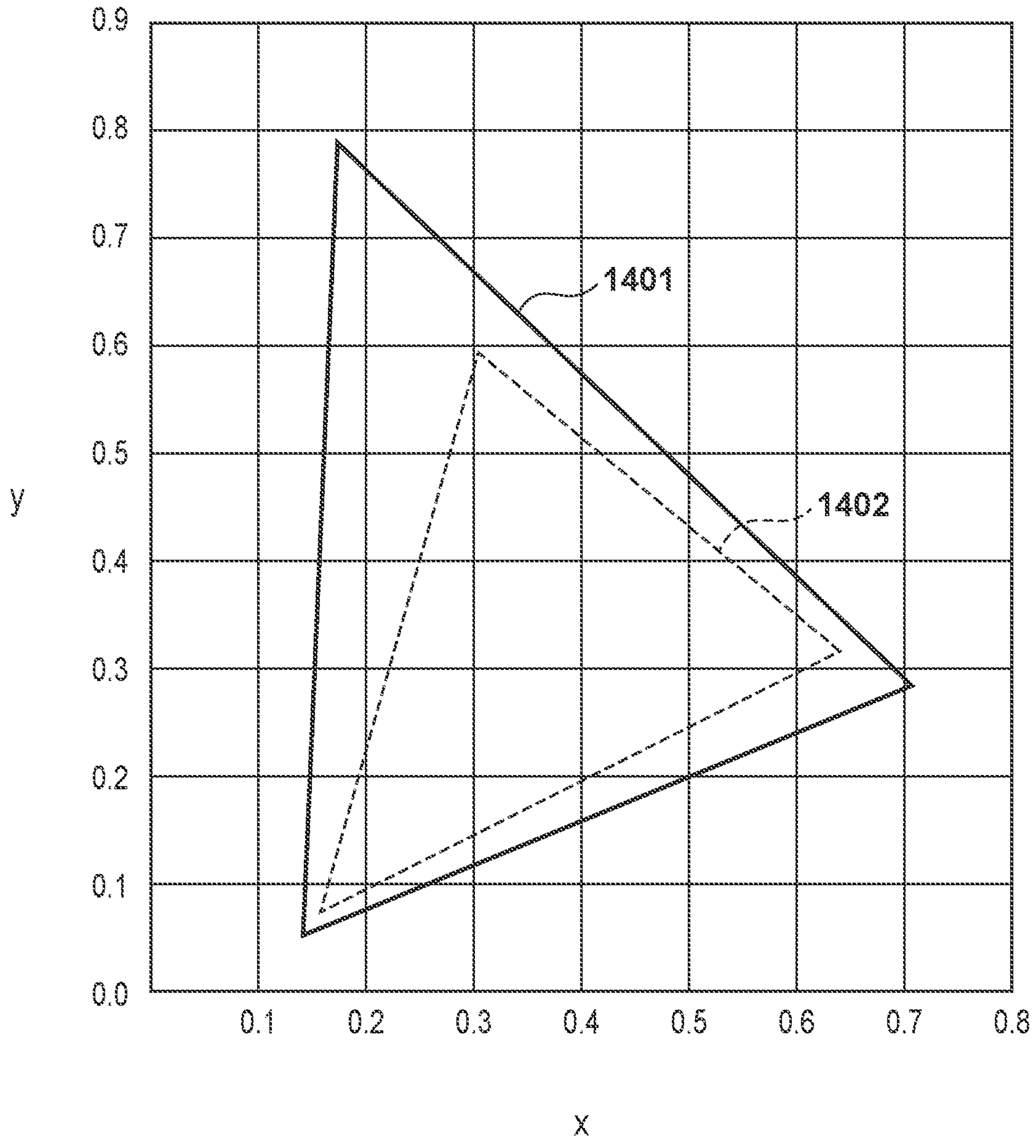
FIG. 14 is a diagram illustrating color gamut characteristics.

The following describes a configuration of the color gamut conversion unit 1101, using the OETFs shown in FIG. 13 and the chromaticity characteristics shown in FIG. 14.

Image data with linear characteristics that have not undergone OETF processing is required to perform the color gamut conversion calculation, and therefore the inverse gamma conversion unit 1201 performs inverse conversion processing on the OETF converted by the HDR OETF conversion unit 703. The color gamut calculation unit 1202 performs a calculation for color gamut conversion, and the gamma conversion unit 1203 again performs conversion to the OETF set by the HDR OETF conversion unit 703.

For example, when displaying an image on a display apparatus compatible with ITU BT.709 while recording image data in the color gamut that conforms to the HDR standard (ITU BT.2100), the inverse gamma conversion unit 1201 converts SMPTE ST 2084 characteristics 1301 into the image data with linear characteristics 1302, and the color gamut calculation unit 1202 converts a color gamut 1401 of ITU BT.2100 to a color gamut 1402 of ITU BT.709. The gamma conversion unit 1203 converts the image data with the linear characteristics 1302 into the SMPTE ST 2084 characteristics 1301.

The image data converted into the OETF of the HDR and the color gamut of the SDR is output by the transmission unit 704 from the image generation apparatus 700 to an external device. The image data output from the transmission unit 704 is input to the display apparatus 740 through the external data transmission line 720. The external data transmission line 720 is a data transmission line exclusively for image data, and may conform to MIPI®, LVDS, sub-LVDS, HDMI®, DisplayPort®, or SDI, for example.

The display apparatus 740 receives the image data via a reception unit 741. The image data received by the reception unit 741 is subjected to light emission characteristic inverse conversion processing that is performed by the light emission characteristic inverse conversion unit 742. The image data that has undergone light emission characteristic inverse conversion processing is converted by a DA conversion unit 743 from digital data to analog data. The analog data converted by the DA conversion unit 743 is converted by a light emission characteristic conversion unit 744 so as to have light emission characteristics corresponding to the display unit/device 745, and is displayed on the display unit/device 745.

As described above, when image data that conforms to the existing standard, which is the OETF of the HDR that is close to the light emission characteristics of an OLED or the like in the present embodiment, is selected as the image data to be transmitted through the external data transmission line 720, it is desirable that data transfer regarding the color gamut is also performed according to the data by ITU BT.2100 that conforms to the HDR standard. In this case, the color gamut conversion processing from ITU BT.2100 to ITU BT.709 is to be performed by a display apparatus with a bit precision of ten bits or lower.

The image data of the external data transmission line 720 is ITU BT.709 with a color gamut equivalent to SDR and SMPTE ST 2084 with a gamma equivalent to HDR, which no longer conform to standards such as the HDR and the SDR. However, by performing color gamut conversion processing using an image generation apparatus that supports processing with a bit precision of no lower than 10 bits, it is possible to perform accurate conversion processing.

Note that the present embodiment may be combined with the above-described image generation apparatus 400 shown in FIG. 4 according to the second embodiment or the image generation apparatus 600 shown in FIG. 6 according to the third embodiment. In such a case, the image data generated by the HDR OETF conversion unit 408 of the image generation apparatus 400 shown in FIG. 4 and the image data generated by the light emission characteristic inverse conversion unit 603 of the image generation apparatus 600 shown in FIG. 6 may be converted into a color gamut that matches the display capabilities of the display apparatus, and the bit precision of the external data transmission line, using the color gamut conversion unit 1101.

EVFs have a playback mode in which image data recorded on a memory card or the like is displayed thereon, in addition to the function of enabling the user to check the object before performing image capturing, which is a function taken over from OVFs. Also, for image files recorded on a memory card or the like, there are multi formats that claim luminance characteristics close to those of human vision, such as the SDR and the HDR. These formats differ from each other in maximum luminance and luminance characteristics. If image data in these formats is displayed on an EVF without change, for example, the SDR will be displayed very dark and the HDR will be displayed brightly. In addition, the difference in maximum brightness for each HDR also causes a difference in brightness between images. The display luminance can be adjusted on the EVF side by changing the amount of current applied to the display panel. However, the emission characteristics are also affected by the change, and therefore gamma adjustment is required for each input image.

Sixth Embodiment

The following describes a sixth embodiment.

Figure 15:
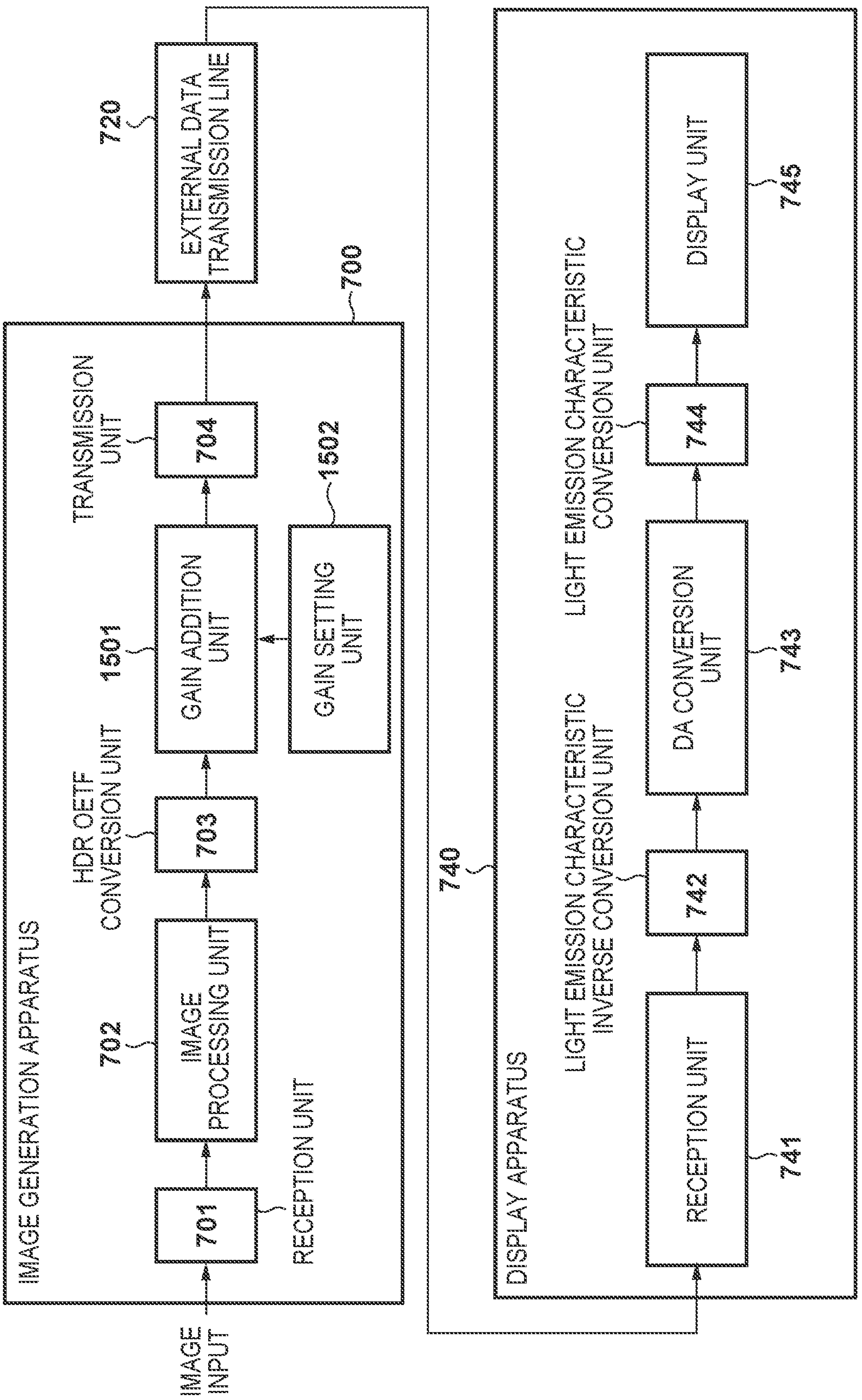
FIG. 15 is a block diagram illustrating a configuration of a display system according to a sixth embodiment.

FIG. 15 is a block diagram illustrating a configuration of a display system according to the sixth embodiment for eliminating the above-described difference in brightness between images.

Figure 16:
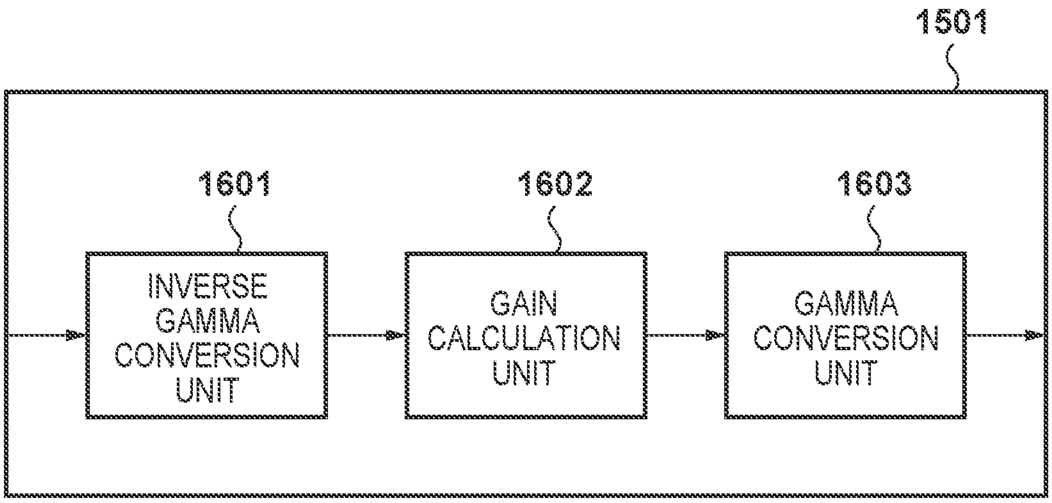
FIG. 16 is a block diagram illustrating a gain addition unit.

The system according to the sixth embodiment includes an image generation apparatus 700 that can perform processing with a bit precision of no lower than ten bits, an external data transmission line 720 with a bit precision of ten bits or lower, and a display apparatus 740 that is compatible with the SDR standard compliant color gamut (ITU BT.709). The image generation apparatus 700 receives image data input from an external device, via a reception unit 701. An image processing unit 702 performs image processing on the image data received by the reception unit 701. The image data that has undergone image processing is converted into the OETF of the HDR by an HDR OETF conversion unit 703. A gain addition unit 1501 adds a gain for adjusting the luminance to be displayed on the display apparatus 740, to the input data, by using a gain value set by a gain setting unit 1502. As shown in FIG. 16, the gain addition unit 1501 includes an inverse gamma conversion unit 1601, a gain calculation unit 1602, and a gamma conversion unit 1603.

The following describes a configuration of the gain addition unit 1501 with reference to the OETFs shown in FIG. 13. Image data with linear characteristics that have not undergone OETF processing is required to perform a calculation for adding a gain. Therefore, the inverse gamma conversion unit 1601 performs inverse conversion processing on the OETF converted by the HDR OETF conversion unit 703. The gain calculation unit 1602 performs a calculation for adding a gain. The gamma conversion unit 1603 again performs conversion to the OETF set by the HDR OETF conversion unit 703.

Specifically, the gain calculation unit 1602 outputs the result of adding a gain by multiplying the input data by a gain value, using the gain value set by the gain setting unit 1502 shown in FIG. 15 in response to a user operation, for example. For example, Equation (1) shown below is used to multiply pieces of input data rin, gin, and bin respectively corresponding to R, G, and B by a gain value x, and output pieces of data rout, gout, and bout.

$$rout=x*rin$$

$$gout=x*gin$$

$$bout=x*bin \qquad \text{Equation (1)}$$

The image data converted into the OETF of the HDR and the color gamut of the SDR is output by the transmission unit 704 from the image generation apparatus 700 to an external device. The image data output from the transmission unit 704 is input to the display apparatus 740 through the external data transmission line 720. The external data transmission line 720 is a data transmission line exclusively for image data, and may conform to MIPI®, LVDS, sub-LVDS, HDMI®, DisplayPort®, or SDI, for example.

The display apparatus 740 receives the image data via a reception unit 741. The image data received by the reception unit 741 is subjected to light emission characteristic inverse conversion processing that is performed by the light emission characteristic inverse conversion unit 742. The image data that has undergone light emission characteristic inverse conversion processing is converted by a DA conversion unit 743 from digital data to analog data. The analog data converted by the DA conversion unit 743 is converted by a light emission characteristic conversion unit 744 so as to have light emission characteristics corresponding to the display unit 745, and is displayed on the display unit 745.

As described above, by applying a gain in a linear space on the image processing engine side, it is possible to display content with no difference in brightness according to the maximum luminance of the OLED even when the SDR, the HDR, and so on are mixed therein.

Seventh Embodiment

The following describes a seventh embodiment.

Figure 17:
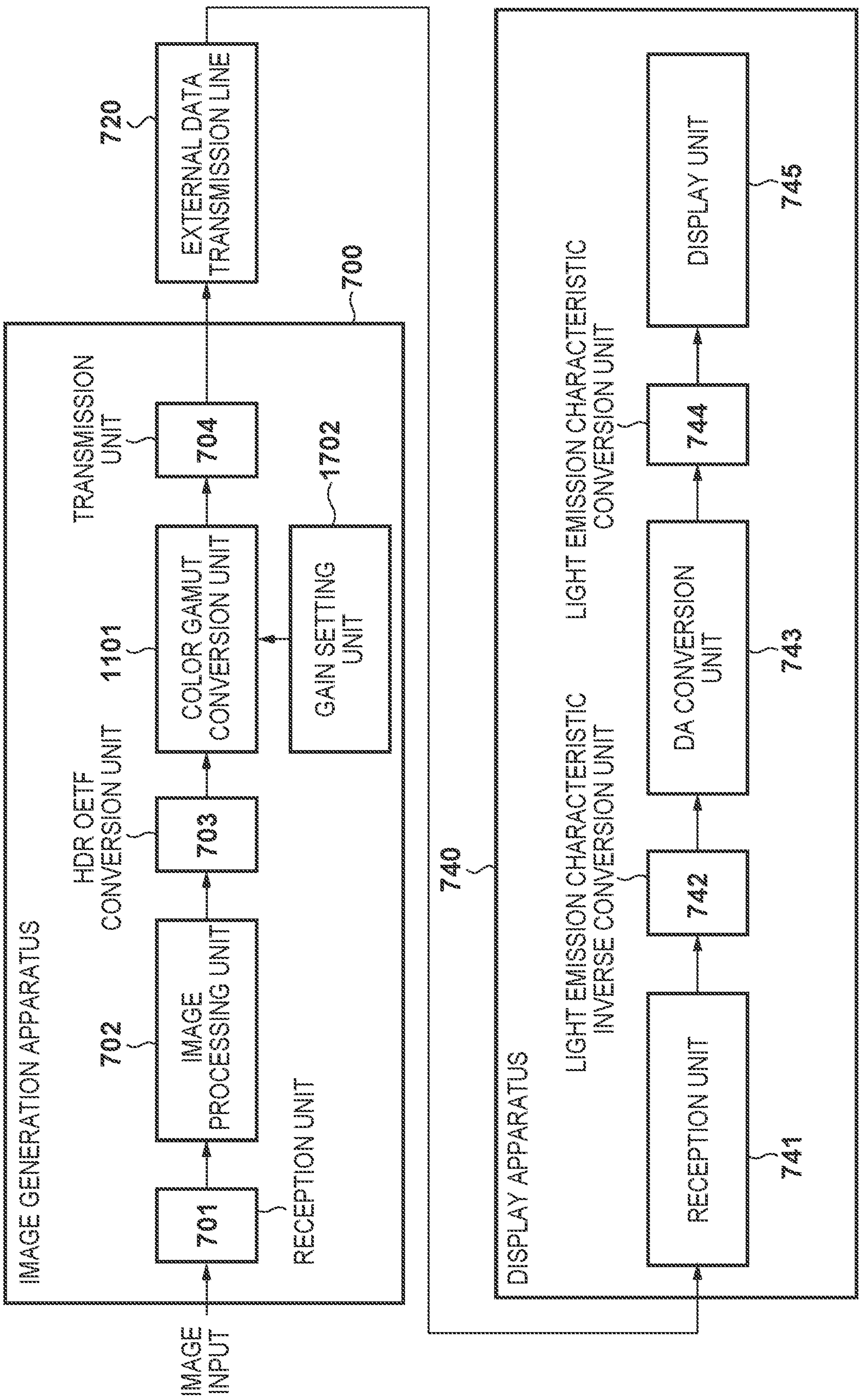
FIG. 17 is a block diagram illustrating a configuration of a display system according to a seventh embodiment.

FIG. 17 is a block diagram illustrating a configuration of a display system according to the seventh embodiment for eliminating the above-described difference in brightness between images.

The system according to the seventh embodiment includes an image generation apparatus 700 that can perform processing with a bit precision of no lower than ten bits, an external data transmission line 720 with a bit precision of ten bits or lower, and a display apparatus 740 that is compatible with the SDR standard compliant color gamut (ITU BT.709). The image generation apparatus 700 receives image data input from an external device, via a reception unit 701. An image processing unit 702 performs image processing on the image data received by the reception unit 701. The image data that has undergone image processing is converted into the OETF of the HDR by an HDR OETF conversion unit 703. A color gamut conversion unit 1101 performs conversion to a color gamut that matches the display capabilities of the display apparatus 740, at a bit precision of the external data transmission line 720. A gain setting unit 1702 sets a gain value that is used by the color gamut conversion unit 1101 to perform a calculation for color gamut conversion. As shown in FIG. 12, the color gamut conversion unit 1101 includes an inverse gamma conversion unit 1201, a color gamut calculation unit 1202, and a gamma conversion unit 1203.

The following describes a configuration of the color gamut conversion unit 1101, using the OETFs shown in FIG. 13 and the chromaticity characteristics shown in FIG. 14.

Image data with linear characteristics that have not undergone OETF processing is required to perform a calculation for color gamut conversion. Therefore, the inverse gamma conversion unit 1201 performs inverse conversion processing on the OETF converted by the HDR OETF conversion unit 703. The color gamut calculation unit 1202 performs a calculation for color gamut conversion. The gamma conversion unit 1203 again performs conversion to the OETF set by the HDR OETF conversion unit 703.

For example, when displaying an image on a display apparatus compatible with ITU BT.709 while recording image data in the color gamut that conforms to the HDR standard (ITU BT.2100), the inverse gamma conversion unit 1201 converts SMPTE ST 2084 characteristics 1301 into the image data with linear characteristics 1302, and the color gamut calculation unit 1202 converts a color gamut 1401 of ITU BT.2100 to a color gamut 1402 of ITU BT.709. For example, Equation (2) shown below is used to perform a 3×3 matrix calculation with coefficients a to i on pieces of input data rin, gin, and bin respectively corresponding to R, G, and B, and output pieces of data rout, gout, and bout.

$$\begin{bmatrix} rout \\ gout \\ bout \end{bmatrix} = \begin{bmatrix} a & b & c \\ d & e & f \\ g & h & i \end{bmatrix} \begin{bmatrix} rin \\ gin \\ bin \end{bmatrix} \qquad \text{Equation (2)}$$

The color gamut calculation unit 1202 also has the function of performing a gain calculation, and outputs the result of adding a gain by uniformly multiplying the matrix coefficients of the color gamut calculation unit 1202 by a gain value, using the gain value set by the gain setting unit 1702 shown in FIG. 17 in response to a user operation, for example. For example, Equation (3) shown below is used to perform a matrix calculation with coefficients a*x to i*x that are coefficients multiplied by a gain value x, on pieces of input data rin, gin, and bin respectively corresponding to R, G, and B, and output pieces of data rout', gout', and bout'.

$$\begin{bmatrix} rout' \\ gout' \\ bout' \end{bmatrix} = \begin{bmatrix} a*x & b*x & c*x \\ d*x & e*x & f*x \\ g*x & h*x & i*x \end{bmatrix} \begin{bmatrix} rin \\ gin \\ bin \end{bmatrix} \quad \text{Equation (3)}$$

The gamma conversion unit 1203 converts the image data with the linear characteristics 1302 into the SMPTE ST 2084 characteristics 1301.

The image data converted into the OETF of the HDR and the color gamut of the SDR is output by the transmission unit 704 from the image generation apparatus 700 to an external device. The image data output from the transmission unit 704 is input to the display apparatus 740 through the external data transmission line 720. The external data transmission line 720 is a data transmission line exclusively for image data, and may conform to MIPI®, LVDS, sub-LVDS, HDMI®, DisplayPort®, or SDI, for example.

The display apparatus 740 receives the image data via a reception unit 741. The image data received by the reception unit 741 is subjected to light emission characteristic inverse conversion processing that is performed by the light emission characteristic inverse conversion unit 742. The image data that has undergone light emission characteristic inverse conversion processing is converted by a DA conversion unit 743 from digital data to analog data. The analog data converted by the DA conversion unit 743 is converted by a light emission characteristic conversion unit 744 so as to have light emission characteristics corresponding to the display unit 745, and is displayed on the display unit 745.

As described above, by applying a gain in a linear space on the image processing engine side, it is possible to display content with no difference in brightness according to the maximum luminance of the OLED even when the SDR, the HDR, and so on are mixed therein.

Other Embodiments

Embodiment(s) of the disclosure (e.g., the processor 120) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium (e.g., memory 125) may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-109002, filed Jun. 24, 2020 and 2020-173541, filed Oct. 14, 2020 which are hereby incorporated by reference herein in their entirety.

What is claimed is:

1. An image generation apparatus which outputs image data to a display apparatus that includes a display device that is capable of displaying a High Dynamic Range (HDR) image or a Standard Dynamic Range (SDR) image through an external data transmission line, the image generation apparatus comprising:

a processor and a memory coupled to the processor and storing instructions that, when executed by the processor, cause the processor to function as:

a light emission characteristic inverse conversion unit configured to perform inverse conversion on image data with respect to light emission characteristics of the display device; and a transmission unit configured to transmit the image data generated by the light emission characteristic inverse conversion unit to the display apparatus through the external data transmission line in a case where a sum of squares of a difference between the light emission characteristics of the display device and an Electro-Optical Transfer Function (EOTF) of the HDR is smaller than a sum of squares of a difference between the light emission characteristics of the display device and the EOTF of the SDR, a bit precision of image data that is output from the image generation apparatus is no lower than a bit precision of the external data transmission line, and an image of the HDR is to be displayed on the display device.

2. The apparatus according to claim 1, wherein the processor further functions as:

an HDR OETF conversion unit configured to perform conversion on image data based on an OETF of an HDR; and an SDR OETF conversion unit configured to perform conversion on image data based on an OETF of an SDR, wherein the light emission characteristic inverse conversion unit performs inverse conversion on the image data generated by the HDR OETF conversion unit with respect to the light emission characteristics of the display device.

3. The apparatus according to claim 2, wherein the processor further functions as a first image selection unit configured to select either the image data generated by the light emission characteristic inverse conversion unit or the image data generated by the SDR OETF conversion unit, wherein the image data selected by the first image selection unit is output to the display apparatus through the external data transmission line.

4. The apparatus according to claim 3, wherein in the case where the sum of squares of the difference between the light emission characteristics of the display device and the Electro-Optical Transfer Function (EOTF) of the HDR is not smaller than the sum of squares of the difference between the light emission characteristics of the display device and the EOTF of the SDR, the first image selection unit selects the image data generated by the SDR OETF conversion unit, and in the case where when the sum of squares of the difference between the light emission characteristics of the display device and the Electro-Optical Transfer Function (EOTF) of the HDR is smaller than the sum of squares of the difference between the light emission characteristics of the display device and the EOTF of the SDR, the first image selection unit compares a bit precision of the image data generated by the OETF conversion unit and a bit precision of the external data transmission line, upon determining that the bit precision of the image data generated by the OETF conversion unit is lower than the bit precision of the external data transmission line, the first image selection unit selects the image data generated by the SDR OETF conversion unit, and upon determining that the bit precision of the image data generated by the OETF conversion unit is no lower than the bit precision of the external data transmission line, the first image selection unit determines whether or not an image that is to be displayed is the HDR, and upon determining that the image to be displayed is not the HDR, the first image selection unit selects the image data generated by the SDR OETF conversion unit, and upon determining that the image to be displayed is the HDR, the first image selection unit selects the image data generated by the light emission characteristic inverse conversion unit.

5. The apparatus according to claim 1, wherein the display device is formed of organic EL, the EOTF of the HDR is SMPTE STANDARD 2084, and the EOTF of the SDR is RECOMMENDATION ITU-R BT.709.

6. The apparatus according to claim 1, wherein the external data transmission line has a bit precision of no higher than 10 bits, and conforms to Mobile Industry Processor Interface (MIPI®), Low Voltage Differential Signaling (LVDS), subLVDS, High-Definition Multimedia Interface (HDMI®), DisplayPort®, or Serial Digital Interface (SDI).

7. The apparatus according to claim 1, wherein the processor further functions as a color gamut conversion unit configured to convert the image data generated by the light emission characteristic inverse conversion unit into image data that has a color gamut that matches display capabilities of the display device, wherein the color gamut conversion unit includes:

an inverse gamma conversion unit configured to convert the image data generated by the light emission characteristic inverse conversion unit into image data that has a linear gamma;

a color gamut calculation unit configured to convert the image data generated by the inverse gamma conversion unit into image data that has the color gamut of the display device; and a gamma conversion unit configured to convert the image data obtained by the color gamut calculation unit into image data that has the same gamma as the image data generated by the light emission characteristic inverse conversion unit.

8. The apparatus according to claim 7, wherein the color gamut of the image data generated by the inverse gamma conversion unit corresponds to an HDR color gamut.

9. The apparatus according to claim 7, wherein the color gamut of the display device corresponds to an SDR color gamut.

10. The apparatus according to claim 1, wherein the processor further functions as a color gamut conversion unit configured to convert the image data generated by the light emission characteristic inverse conversion unit into image data that has a color gamut that matches display capabilities of the display device, wherein the color gamut conversion unit includes:

an inverse gamma conversion unit configured to convert the image data generated by the light emission characteristic inverse conversion unit into image data that has a linear gamma;

a gain calculation unit configured to add a gain to the image data generated by the inverse gamma conversion unit; and a gamma conversion unit configured to convert the image data obtained by the gain calculation unit into image data that has the same gamma as the image data generated by the light emission characteristic inverse conversion unit.

11. The apparatus according to claim 10, wherein the gain calculation unit has a matrix calculation function to additionally perform color gamut calculation.

12. An image generation apparatus which outputs image data to a display apparatus that includes a display device that is capable of displaying a High Dynamic Range (HDR) image or a Standard Dynamic Range (SDR) image through an external data transmission line, the image generation apparatus comprising:

a processor and a memory coupled to the processor and storing instructions that, when executed by the processor, cause the processor to function as:

an HDR Optical-Electro Transfer Function (OETF) conversion unit configured to perform conversion on image data based on an OETF of an HDR; and a transmission unit configured to transmit the image data generated by the HDR OETF conversion unit to the display apparatus through the external data transmission line in a case where a sum of squares of a difference between light emission characteristics of the display device and an Electro-Optical Transfer Function (EOTF) of the HDR is smaller than a sum of squares of a difference between the light emission characteristics of the display device and the EOTF of the SDR, a bit precision of image data that is output from the image generation apparatus is no lower than a bit precision of the external data transmission line, and an image of the HDR is to be displayed on the display device.

13. The apparatus according to claim 12, wherein the processor further functions as:

an OETF conversion unit configured to perform conversion on image data based on an OETF; and an SDR OETF conversion unit configured to perform conversion on image data based on an OETF of an SDR, wherein the HDR OETF conversion unit converts the image data generated by the OETF conversion unit into image data that is based on the OETF of the HDR when the image data generated by the OETF conversion unit is image data that is based on the OETF of the SDR, and the SDR OETF conversion unit converts the image data generated by the OETF conversion unit into image data that is based on the OETF of the SDR when the image data generated by the OETF conversion unit is image data that is based on the OETF of the HDR.

14. The apparatus according to claim 13, wherein the processor further functions as a first image selection unit configured to select either the image data generated by the HDR OETF conversion unit or the image data generated by the SDR OETF conversion unit, wherein the image data selected by the first image selection unit is output to the display apparatus through the external data transmission line.

15. The apparatus according to claim 14, wherein in the case where the sum of squares of the difference between the light emission characteristics of the display device and the Electro-Optical Transfer Function (EOTF) of the HDR is not smaller than the sum of squares of the difference between the light emission characteristics of the display device and the EOTF of the SDR, the first image selection unit selects the image data generated by the SDR OETF conversion unit, and in the case where the sum of squares of the difference between the light emission characteristics of the display device and the Electro-Optical Transfer Function (EOTF) of the HDR is smaller than the sum of squares of the difference between the light emission characteristics of the display device and the EOTF of the SDR, the first image selection unit compares a bit precision of the image data generated by the OETF conversion unit and a bit precision of the external data transmission line, upon determining that the bit precision of the image data generated by the OETF conversion unit is lower than the bit precision of the external data transmission line, the first image selection unit selects the image data generated by the SDR OETF conversion unit, and upon determining that the bit precision of the image data generated by the OETF conversion unit is no lower than the bit precision of the external data transmission line, the first image selection unit determines whether or not an image that is to be displayed is the HDR and, upon determining that the image to be displayed is not the HDR, the first image selection unit selects the image data generated by the SDR OETF conversion unit, and upon determining that the image to be displayed is the HDR, the first image selection unit selects the image data generated by the HDR OETF conversion unit.

16. The apparatus according to claim 12, wherein the processor further functions as a color gamut conversion unit configured to convert the image data generated by the HDR OETF conversion unit into image data that has a color gamut that matches display capabilities of the display device, wherein the color gamut conversion unit includes:

an inverse gamma conversion unit configured to convert the image data generated by the HDR OETF conversion unit into image data that has a linear gamma;

a color gamut calculation unit configured to convert the image data generated by the inverse gamma conversion unit into image data that has the color gamut of the display device; and a gamma conversion unit configured to convert the image data obtained by the color gamut calculation unit into image data that has the same gamma as the image data generated by the HDR OETF conversion unit.

17. The apparatus according to claim 12, wherein the processor further functions as a color gamut conversion unit configured to convert the image data generated by the HDR OETF conversion unit into image data that has a color gamut that matches display capabilities of the display device, wherein the color gamut conversion unit includes:

an inverse gamma conversion unit configured to convert the image data generated by the HDR OETF conversion unit into image data that has a linear gamma;

a gain calculation unit configured to add a gain to the image data generated by the inverse gamma conversion unit; and a gamma conversion unit configured to convert the image data obtained by the gain calculation unit into image data that has the same gamma as the image data generated by the HDR OETF conversion unit.

18. A method of controlling an image generation apparatus which outputs image data to a display apparatus that includes a display device that is capable of displaying a High Dynamic Range (HDR) image or a Standard Dynamic Range (SDR) image through an external data transmission line, the method comprising:

performing inverse conversion on image data with respect to light emission characteristics of the display device; and transmitting the image data that has undergone the inverse conversion to the display apparatus through the external data transmission line in a case where a sum of squares of a difference between the light emission characteristics of the display device and an Electro-Optical Transfer Function (EOTF) of the HDR is smaller than a sum of squares of a difference between the light emission characteristics of the display device and the EOTF of the SDR, a bit precision of image data that is output from the image generation apparatus is no lower than a bit precision of the external data transmission line, and an image of the HDR is to be displayed on the display device.

19. A non-transitory computer-readable storage medium storing a program for causing a processor to execute a method of controlling an image generation apparatus which outputs image data to a display apparatus that includes a display device that is capable of displaying a High Dynamic Range (HDR) image or a Standard Dynamic Range (SDR) image through an external data transmission line, the method comprising:

performing inverse conversion on image data with respect to light emission characteristics of the display device; and transmitting the image data that has undergone the inverse conversion to the display apparatus through the external data transmission line in a case where a sum of squares of a difference between the light emission characteristics of the display device and an Electro-Optical Transfer Function (EOTF) of the HDR is smaller than a sum of squares of a difference between the light emission characteristics of the display device and the EOTF of the SDR, a bit precision of image data that is output from the image generation apparatus is no lower than a bit precision of the external data transmission line, and an image of the HDR is to be displayed on the display device.

* * * * *